United States Patent [19]

Chan et al.

[11] Patent Number: 4,513,367

[45] Date of Patent: Apr. 23, 1985

[54] CACHE LOCKING CONTROLS IN A MULTIPROCESSOR

[75] Inventors: Shiu K. Chan; John A. Gerardi, both of Poughkeepsie; Bruce L. McGilvray, Pleasant Valley, all of N.Y.

[73] Assignee: International Business Machines Corporation, Armonk, N.Y.

[21] Appl. No.: 246,788

[22] Filed: Mar. 23, 1981

[51] Int. Cl.³ .............................................. G06F 13/08
[52] U.S. Cl. ..................................................... 364/200
[58] Field of Search ................................ 364/200, 900

[56] References Cited

U.S. PATENT DOCUMENTS

| | | | |
|---|---|---|---|
| 3,533,065 | 10/1970 | McGilvray et al. | 364/200 |
| 3,533,082 | 10/1970 | Schnabel et al. | 364/200 |
| 3,539,996 | 11/1970 | Bee et al. | 364/200 |
| 3,564,506 | 2/1971 | Bee et al. | 364/200 |
| 3,736,566 | 5/1973 | Anderson et al. | 340/172.5 |
| 4,077,059 | 2/1978 | Cordi et al. | 364/200 |
| 4,084,230 | 4/1978 | Matick | 364/200 |
| 4,136,386 | 1/1979 | Annunziata | 364/200 |
| 4,164,017 | 8/1979 | Randell et al. | 364/200 |
| 4,195,340 | 3/1980 | Joyce | 364/200 |
| 4,195,341 | 3/1980 | Joyce et al. | 364/200 |
| 4,293,910 | 10/1981 | Flusche et al. | 364/200 |
| 4,317,168 | 2/1982 | Messina et al. | 364/200 |
| 4,387,427 | 6/1983 | Cox et al. | 364/200 |

OTHER PUBLICATIONS

Cache Purge in Store-In-Cache-System, Annunziata et al., IBM Technical Disclosure, vol. 20, No. 9, Feb. 1978.

Lucas, Overlapped Checkpointing, IBM Tech. Disc. Bul., vol. 21, No. 1, 6/78, p. 280.

Weinberger, Buffer Store Replacement by Selection Based on Probable Least Recent Usage, IBM Tech. Disc. Bul., 7/71, p. 430.

Primary Examiner—Gareth D. Shaw
Assistant Examiner—Daniel K. Dorsey
Attorney, Agent, or Firm—Bernard M. Goldman

[57] ABSTRACT

A lock array is provided with bit positions corresponding to each line entry in an associated cache directory. When a lock bit is on, it inhibits the castout, replacement, or invalidation of the associated cache line, which operations are allowed when the lock bit is off. The lock bit may be in an off state while an associated valid bit is set on, but once the lock bit is set on the valid bit cannot be set off until the lock bit is first set off. Lock array controls operate with a replacement selection circuit (which may be conventional) to eliminate each locked line from being a replacement candidate in its congruence class in a set-associative store-in-cache in a multiprocessor (MP). The lock array enables simultaneous reset of all lock bits at each checkpoint without disturbing the status of the associated cache directory. A special type of IE operand request, called a store-interrogate (SI) request, is used to lock the accessed line, whether or not the SI request hits or misses in the cache. Any locked line can continue to receive any fetch, SI, or store cache request from its own IE. Any line remains unlocked as long as it is not accessed by a SI request; that is a line remains unlocked as long as it only receives fetch requests, and fetch requests are generally much more numerous than SI requests. Line locking enables the castout or invalidation of unlocked cache lines during a checkpoint interval.

14 Claims, 20 Drawing Figures

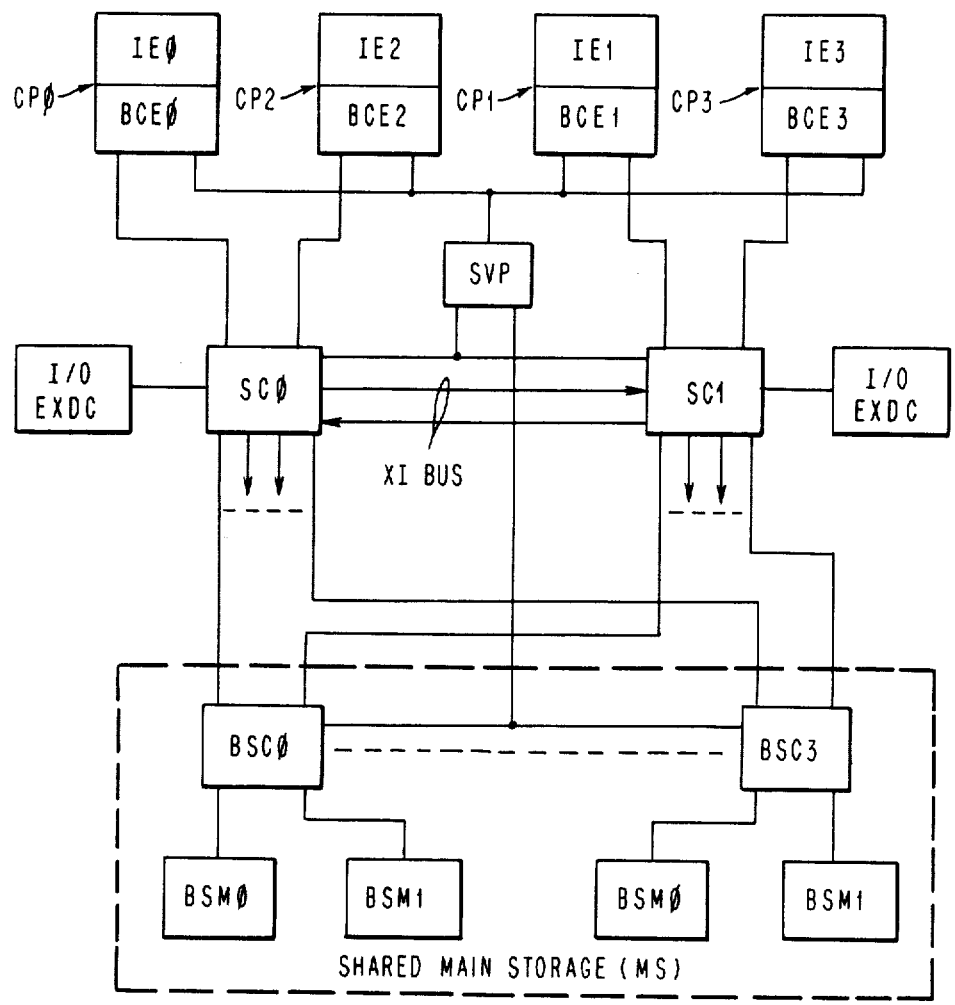

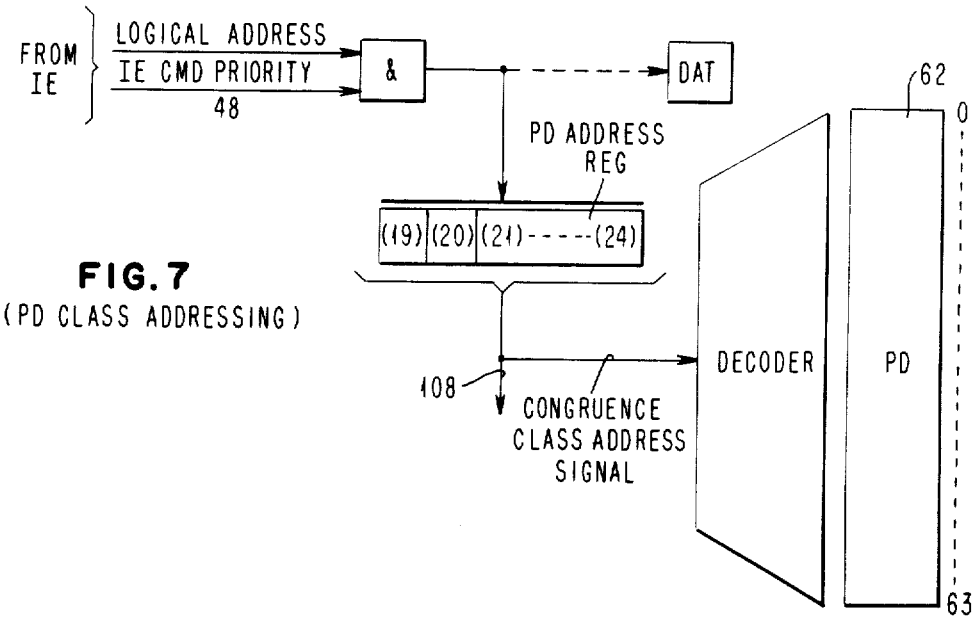

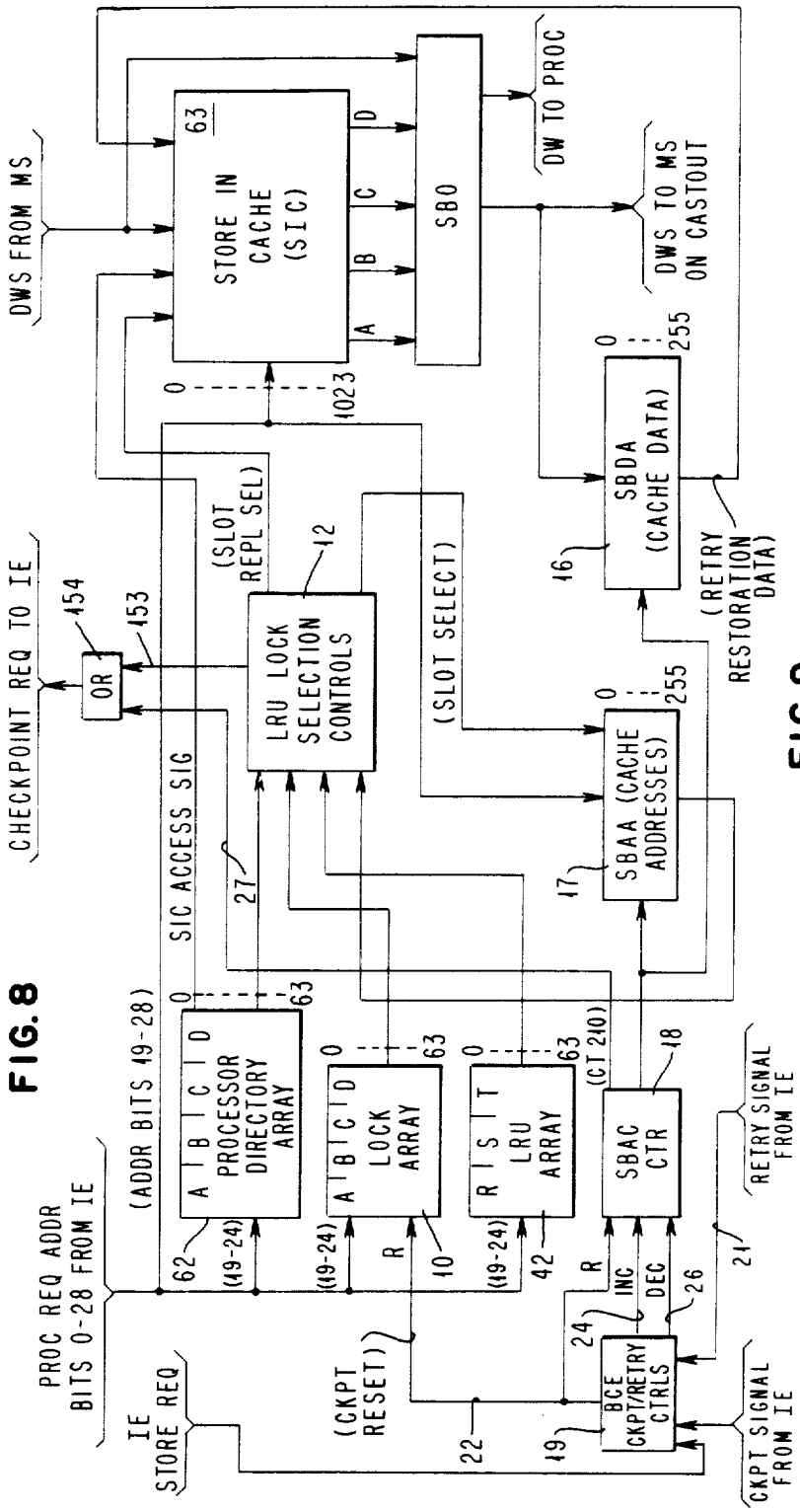

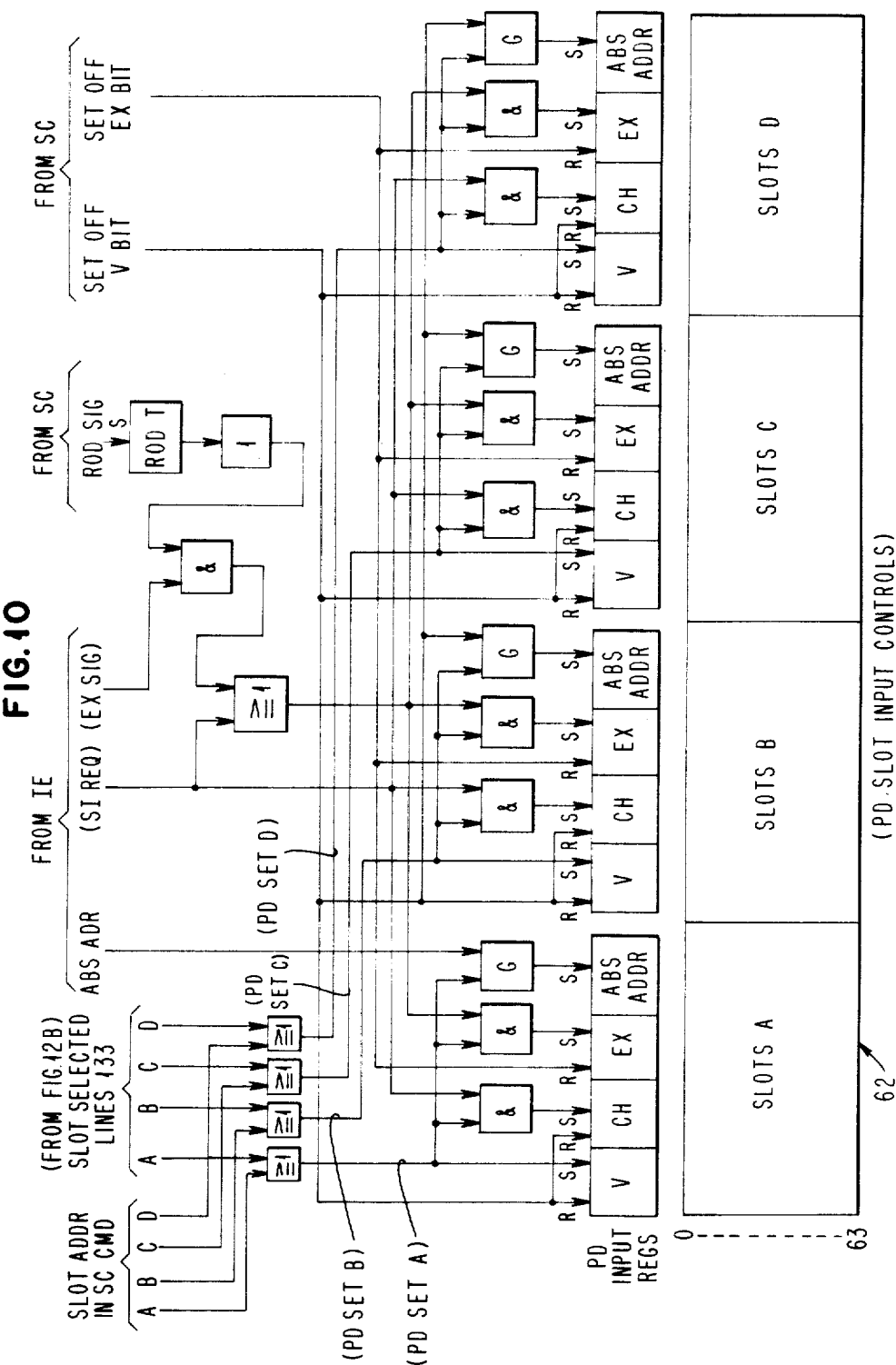

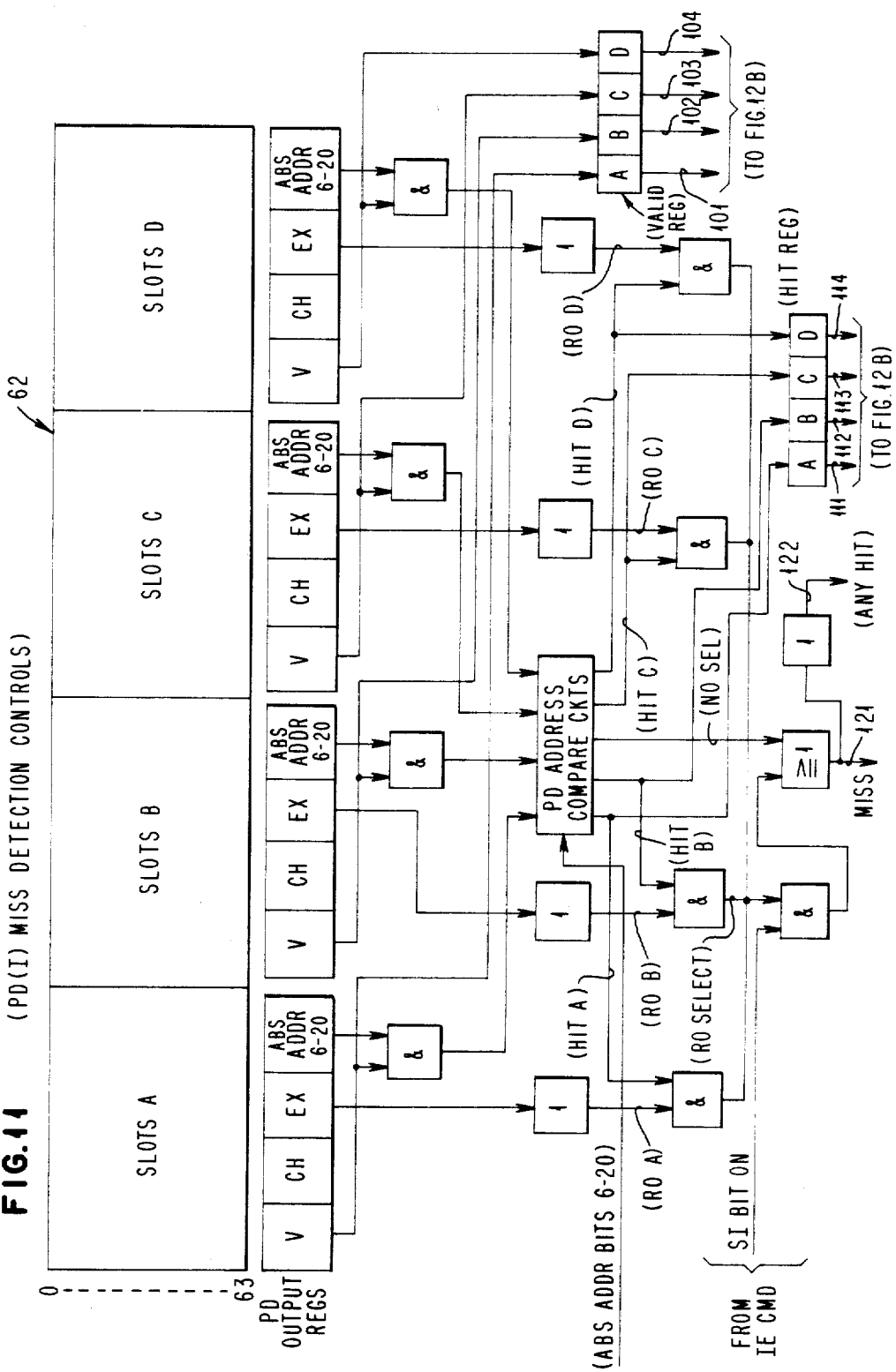

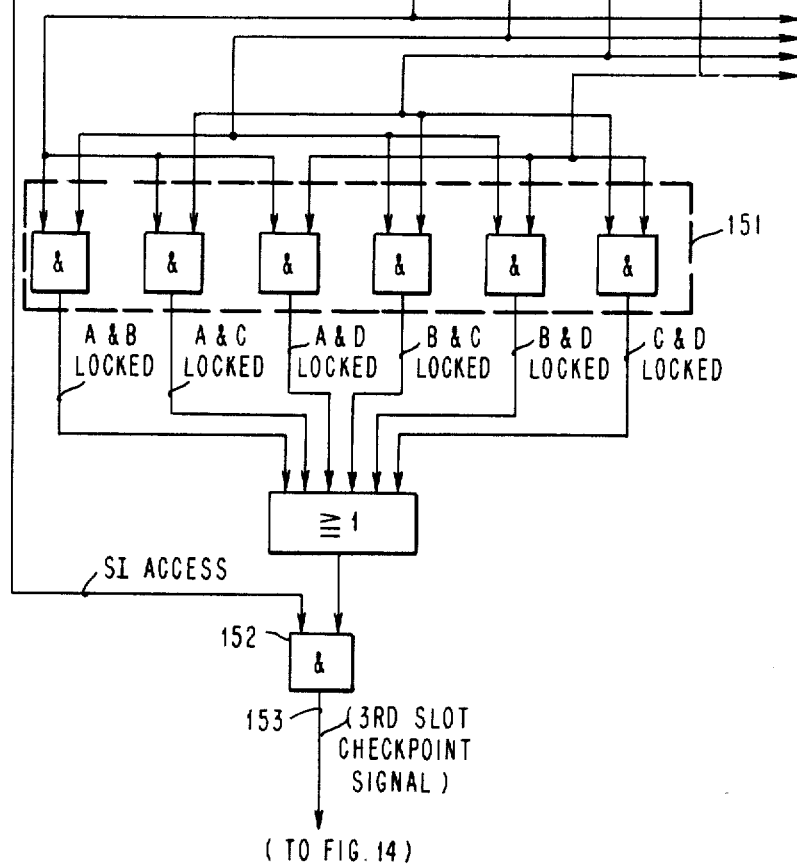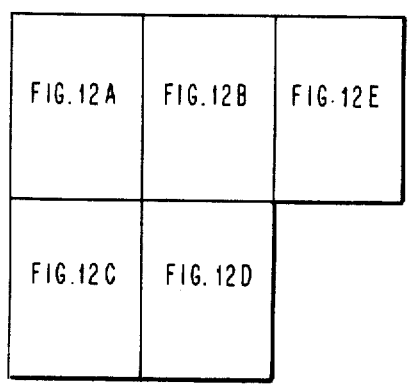

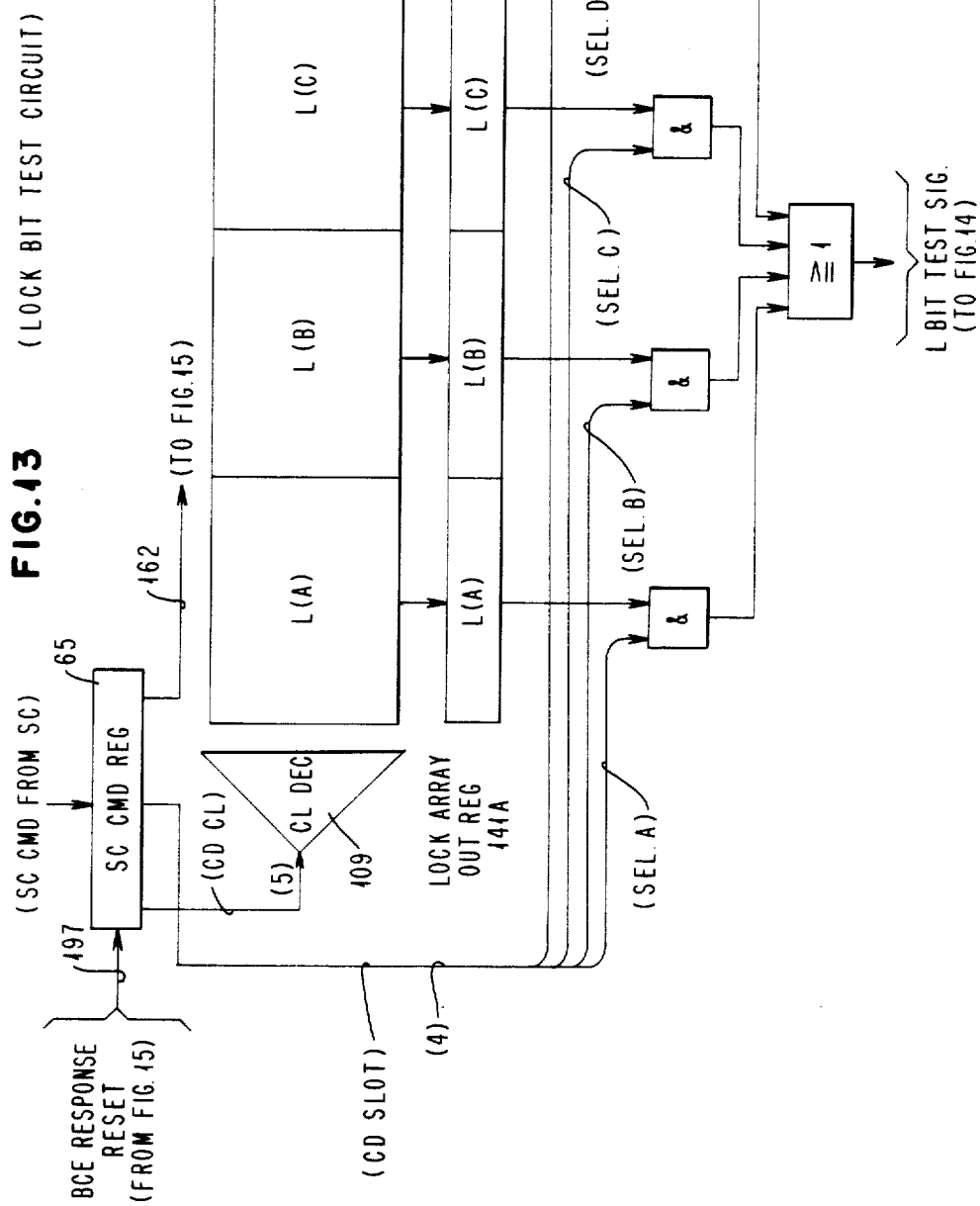

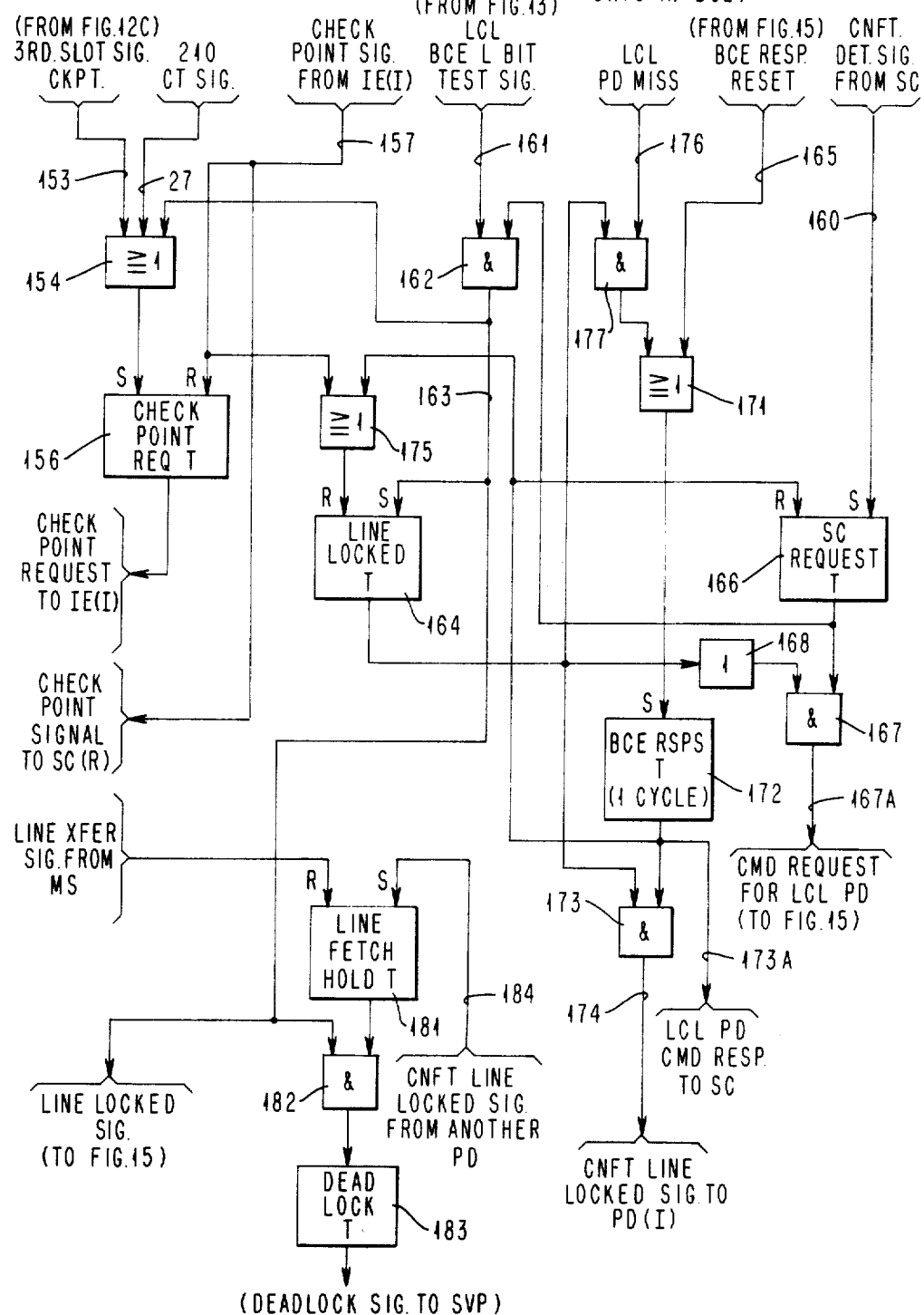
FIG. 14 (LOCK COMMUNICATION & DEADLOCK DETECTION CKTS IN BCE)

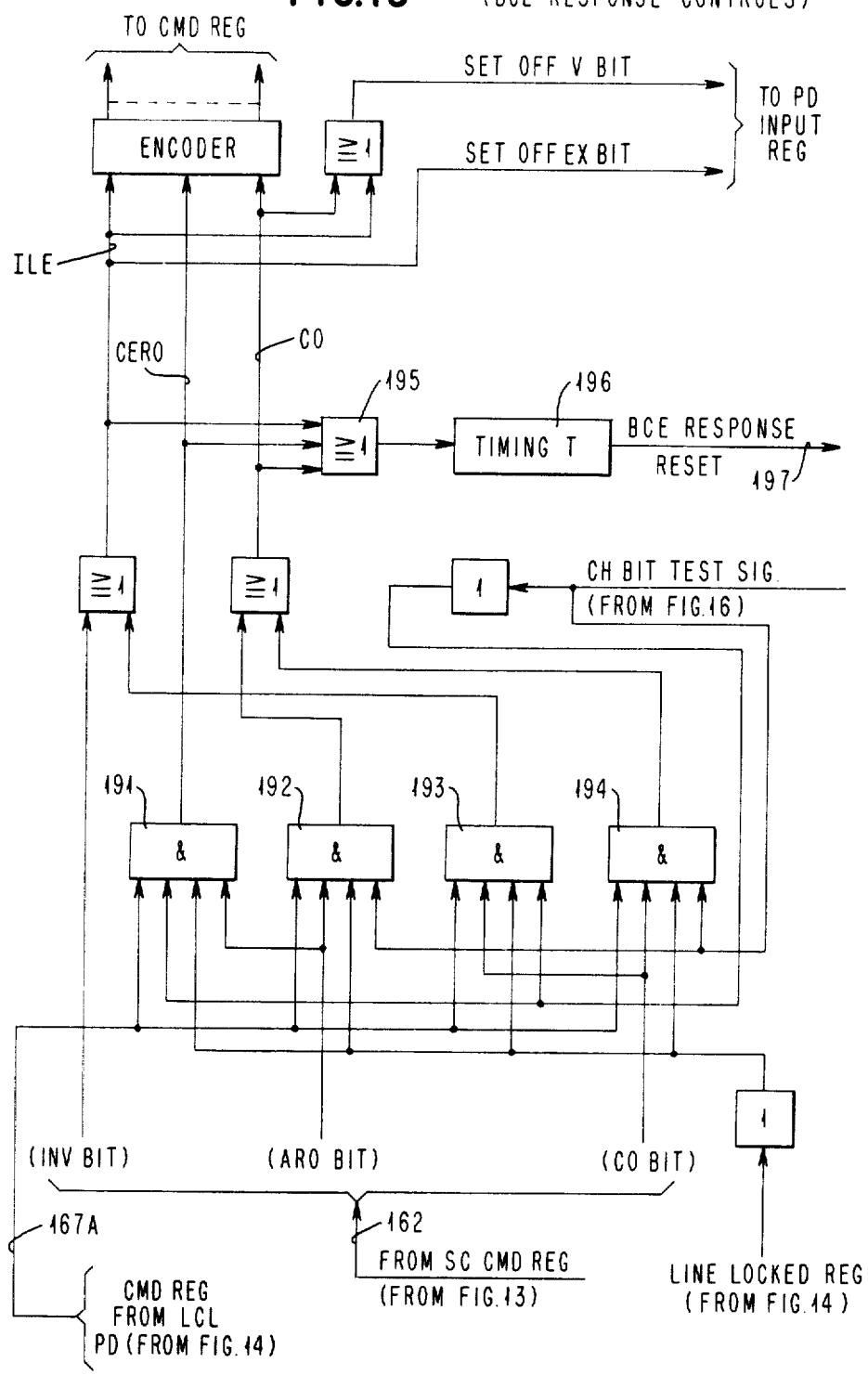
FIG.15 (BCE RESPONSE CONTROLS)

CACHE LOCKING CONTROLS IN A MULTIPROCESSOR

This invention relates to multiprocessor (MP) systems in which each central processor (CP) has a store-in-cache and the ability to checkpoint and retry instruction sequences, and in which the CPs operate substantially independently of each other in a multiprocessing environment.

CROSS-REFERENCE TO RELATED PATENTS

In both large and small data processing systems, techniques have been devised to prevent intermittent error conditions from causing the system to be stopped. In order to accomplish this, instruction retry means and checkpoint/retry means have been provided to save information existing at the beginning of an operation being performed by the processor so that if an error occurs during a particular operation, a prior status of the system can be restored and the operation performed one or more times on the assumption that subsequent attempts at the operation will produce correct results.

A series of U.S.A. patents can be referred to for descriptions of various techniques of instruction retry and checkpoint/retry capability. These are: U.S. Pat. No. 3,533,065—"Data processing System Execution Retry Control" by B. L. McGilvray et al, filed Jan. 15, 1968, issued Oct. 6, 1970; U.S. Pat. No. 3,533,082—"Instruction Retry Apparatus Including Means for Restoring The Original Contents Of Altered Source Operands" by D. L. Schnabel et al, filed Jan. 15, 1968, issued Oct. 6, 1970; U.S. Pat. No. 3,539,996—"Data Processing Machine Function Indicator" by M. W. Bee et al, filed Jan. 15, 1968, issued Nov. 10, 1970; U.S. Pat. No. 3,564,506—"Instruction Retry Byte Counter" by M. W. Bee et al, filed Jan. 17, 1968, issued Feb. 16, 1971; and U.S. Pat. No. 3,736,566—"Central Processing Unit With Hardware Controlled Checkpoint and Retry Facilities" by D. W. Anderson et al, filed Aug. 18, 1971, issued May 29, 1973.

The last cited U.S. Pat. No. 3,736,566 discloses checkpoint and retry in a uniprocessor but does not disclose cache locking. An article published in the June 1978 IBM Technical Disclosure Bulletin on page 280 by D. J. Lucas entitled "Overlapped Checkpointing" in a very general manner discusses checkpointing functions in a multiprocessor in which each time a line is updated in a cache the line is locked until the next checkpoint, and each cache miss causes a new checkpoint to be established. The means and methodology for performing these functions is not disclosed.

The subject invention obtains a unique type of lock controlled replacement methodology for a store-in-cache in each CP in an MP environment. The subject invention differs from the Lucas article in several important aspects of its functions, such as not establishing a new checkpoint upon the occurrence of each cache miss but instead within any checkpoint interval allowing a plurality of cache misses as long as they do not exceed the amount of set-associativity in each congruence class in the cache. Also the Lucas article does not disclose the subject invention's cache locking which allows the cross-interrogation of non-locked lines (which generally comprise most cache lines) to have no degradation on system performance when checkpointing is used.

The subject invention obtains checkpoint/retry advantages in an MP by exercising a unique type of control over the line replacement selection for the cache in each CP by modifying the selection operation performed by prior LRU algorithms, such as that described in an article published in the July 1971 issue of the IBM Technical Disclosure Bulletin on page 430 by A. Weinberger and having the title "Buffer Store Replacement By Selection Based On Probable Least Recent Usage".

Acronyms are used throughout this specification to make it more concise. They are defined in the following ACRONYM TABLE:

| ACRONYM TABLE | |
|---|---|
| Acronym | Definition in Spec. |
| BCE | Buffer Control Unit |
| BSC | BSM Controller |
| CD | Copy Directory |
| CDS | Compare Double and Swap Instructions |
| CH | Change Bit |
| CO | Castout |
| CP | Central Processor |
| CS | Compare and Swap Instruction |
| DW | Doubleword |
| EX | Shareability Bit |
| EXDC | I/O Channel Controller Processor |
| FIFO | First-in/First-out |
| IE | Instruction Execution Unit |
| ILE | Command to Invalidate the Conflicting Entry |
| INV | Invalidate |
| L | Line Lock Bit |
| LCL | Local |
| LRU | Least Recently Used |
| MP | Multiprocessor |
| MS | Main Storage |
| PD | Processor Cache Directory |
| SBAA | Store Back Address Array |
| SBAC | Store Back Array Counter |
| SBDA | Store Back Data Array |
| SC | System Controller |
| SI | Store-Interrogate |
| SIC | Store-In-Cache |
| Suffix(I) | Issuing CP Identifier |
| Suffix(R) | Remote CP Identifier |
| SVP | Service Processor |
| TS | Test and Set Instruction |
| V | Valid Bit |
| XI | Cross-Interrogate |

BRIEF SUMMARY OF THE INVENTION

The present invention provides lock controls for each line when it is locked in a store-in-cache in a multiprocessing system (MP). A locked line cannot be invalidated or castout during a checkpoint interval due to cross-interrogation between CPs, but a locked line can be accessed by the cache's own CP. Cross-interrogation of the other CP caches in an MP occurs when any CP's store-in-cache must fetch a line from a main storage which is shared with the other CPs. The invention provides a lock array for selectively operating with each line entry in an associated cache directory. The line locking controls are combined with the entry replacement selection circuits for each CP store-in-cache. Any type of set-associative replacement selection algorithm may be used with the invention, such as for example the commonly found least-recently-used (LRU) replacement determination circuits, which determine the LRU slot (also called "set" or "compartment, or "entry", or "line") in each congruence class in a set-associative cache.

Any line in each CP cache remains unlocked as long as only fetch requests are made to the line, and it has been statistically determined that most cache accesses are of the fetch type. Statistically, it has been found on the average at any time that only a small percentage of lines in any cache are locked, for example 2%, leaving 98% unlocked and available during any checkpoint interval for replacement by its own CP, or castout or invalidation due to cross-interrogation by any other CP in the MP.

This invention uses a special type of instruction-execution (IE) unit operand request, called a store-interrogate (SI) request, which is an IE request to a cache directory to determine if the cache contains a line of data into which new data is about to be stored. In this application a SI request also sets on the lock bit for an associated cache line. The lock bit is not set on by an IE store request, which directly stores IE data into a cache line following a SI request which locks the line in the cache. Nor is the lock bit set on by a fetch request. A requested doubleword (DW) may or may not be in the requested cache, i.e. the request may either hit or miss in the cache. A miss in the cache causes the replacement circuit to select a entry in the addressed congruence class to receive a line to be fetched from main storage containing the required DW. Upon a hit, an SI request immediately sets the lock bit associated with the line receiving the hit. Upon a miss, the SI request immediately sets on the lock bit for the slot selected by the replacement circuits. A SI request however may set on the lock bit for a following. Any locked line can continue to receive any fetch, SI, or store cache request from its own CP.

This invention uses line locking to enable the castout, or invalidation of non-stored-into cache lines by the cross-interrogation of another CP during a checkpoint interval, while only prohibiting the invalidation or castout of stored-into lines on a temporary basis. Therefore, the line lock controls provided by this invention on the average at any time enables the greater part of each CP cache, i.e. its unlocked lines, to remain available for castout or invalidation, when each CP in the MP is provided with its own checkpoint/retry feature of the type described and claimed in U.S. Pat. No. 3,736,566 in which each CP is provided with temporary storage means and controls enabling an error condition detected during a checkpoint interval to initiate a retry of the CP operation from the last checkpoint.

Without the locking means of this invention, no cross-interrogation between CPs in the MP could be completed during any checkpoint interval, but only could be completed at checkpoints. That is, any CP requesting a line fetch from main storage could not get an unchanged line in the cache of another CP until the next checkpoint by the other CP. As a result, main storage access time for each CP would be made longer by having the cross-interrogations by each CP dependent upon the checkpoint intervals of another CP in the MP.

Another novel system function provided by the locking controls of this invention is to guarantee atomicity for main storage accessing, whenever required by any CP in an MP for executing special instructions, such as the IBM System/370 test and set (TS), compare and swap (CS), and compare double and swap (CDS) instructions, which require a fetch access followed by a store access to the same main storage location without the data in that location having been changed by another CP since the fetch access. This invention obtains the atomic guarantee for any main storage line by having the issuing instruction unit send a store-interrogate (SI) request (instead of the normal fetch request) for an initial fetch access of that line by the instruction, in order to set the lock on for the requested cache line. Then no other CP can access that line in main storage until it is unlocked by the issuing instruction unit when it signals the next checkpoint. The issuing instruction unit may signal the next checkpoint at any time after the atomic accesses are completed.

Therefore, objects of this invention are:
1. To allow checkpoint/retry operations in an MP in which each CP can independently perform checkpoint and retry operations.
2. To permit the selective locking of lines in each CP's store-in-cache in an MP in a manner which does not prevent the castout or invalidation of unlocked lines at any time.
3. To enable checkpoint/retry operations to be done independently by each CP in an MP in a manner which prevents the independent operations of any CP from significantly affecting the main memory accessing by any other CP in the MP.
4. To control slot replacement selection by a line locking means for each cache in an MP. The slot replacement selection control may include a conventional least recently used (LRU) determination circuit.
5. To prevent each cache slot, while locked, from being selectable as a replacement candidate by a cache slot replacement determination means.
6. To guarantee atomic access operations for any instruction which must make plural accesses to the same main storage location, when using a store-in-cache.
7. To use a store-interrogate command by an instruction execution unit to its cache to lock a line in the cache.
8. To enable a store-interrogate command to be used for fetching as well as storing types of operations when the instruction execution unit requires the requested line to be locked.
9. To enable a store-interrogate (SI) command to be used for both store and fetch operations. The SI command always fetches data from the cache and sends it to the IE. For a store operation, a SI request is followed by a store cache command accompanying the data to be stored into the cache, and the IE does not accept the fetch data from the cache. For a SI fetch operation, the IE accepts the cache data, changes it, and then issues a store cache command with the changed data to store it in the same location in the cache.
10. To sense when all slots may become locked in any congruence class store-in-cache in order to issue a request to the IE to unlock all slots.
11. To control cache slot locking in a manner which does not disturb the other tag bits for each entry in a cache directory.
12. To provide a lock array which contains the lock bits for the lines represented in an associated cache directory, so that all lock bits for the associated cache can easily and quickly be reset to an off state without affecting the entries in the associated cache directory.

BRIEF DESCRIPTION OF THE DRAWING

FIG. 1 is a block diagram of a multiprocessing system utilizing the subject invention.

FIG. 2 illustrates the tag bits provided respectively for each processor directory line entry represented therein.

FIGS. 3, 4, 5 and 6 illustrate the types of signals found in various commands used in the described embodiment of the invention.

FIG. 7 illustrates the congruence class addressing controls provided with each processor directory (PD) in each BCE.

FIG. 8 is a simplified illustration of each buffer control element (BCE) found in each central processor (CP) shown in FIG. 1.

FIG. 9 is a diagram showing the sequencing of operations in a checkpoint interval.

FIG. 10 shows in detail the pertinent PD inputs.

FIG. 11 shows in detail the PD hit and miss detection circuits.

FIG. 13 illustrates a lock bit test circuit in each BCE.

FIGS. 14 and 15 illustrate BCE control circuits for lock communication and deadlock detection found in the preferred embodiment.

DETAILED DESCRIPTION

Figure 12A:
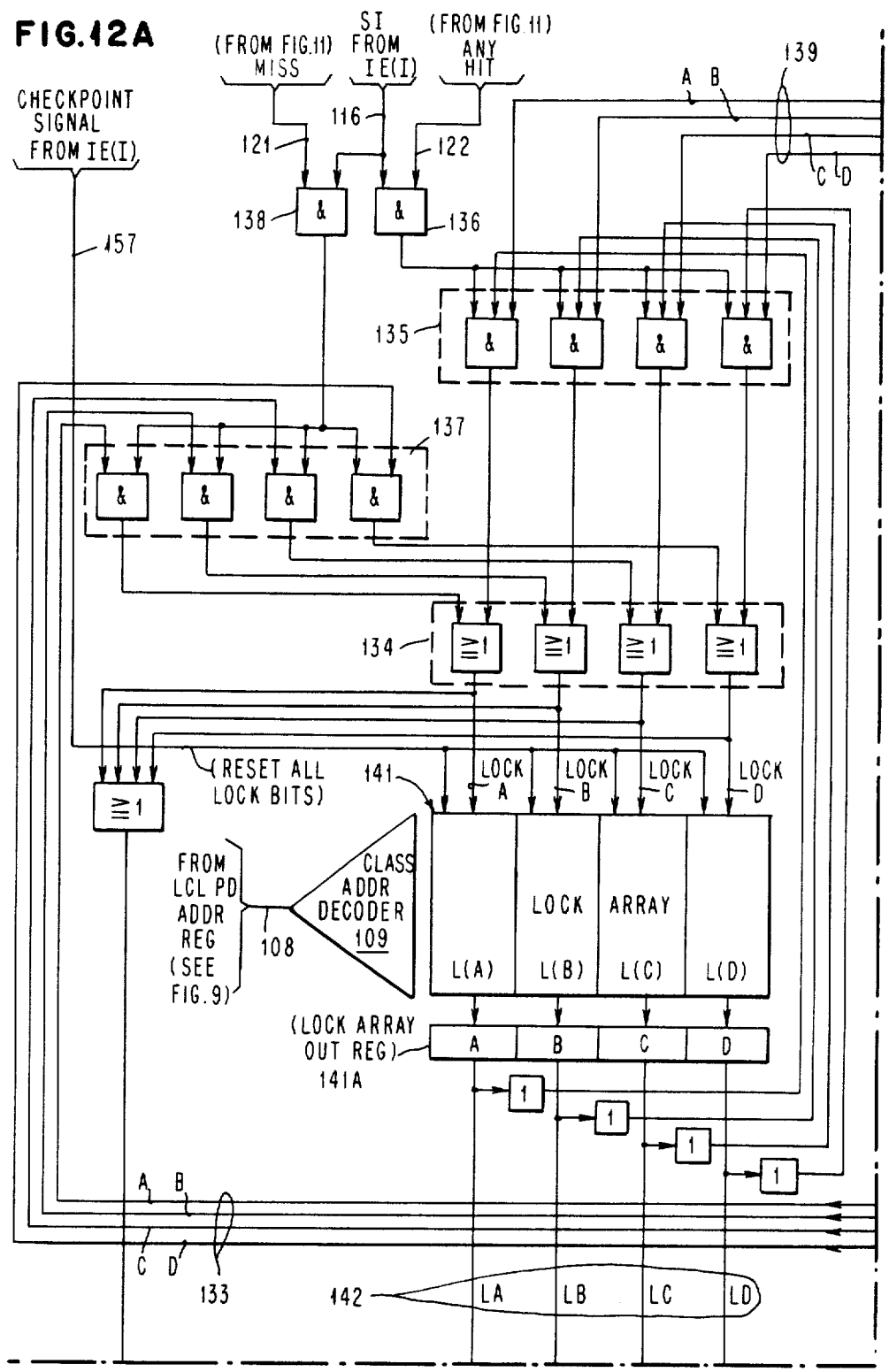
FIGS. 12A, B, C, D and E show a preferred embodiment of the line lockable replacement selection controls in each BCE.

FIG. 1 represents a multiprocessing (MP) system containing the described embodiment of the invention. The MP illustrated in FIG. 1 comprises four central processors, CP0 through CP3, in which each CP includes an instruction execution (IE) unit and a buffer control unit (BCE). Each IE includes the hardware and microcode which issue instructions and their storage requests for the fetching and storing of operands in main storage (MS). The IE begins a fetching or storing operation by issuing a fetch or store-interrogate (SI) command to its cache controls (BCE), which includes a processor store-in-cache (SIC) with its associated processor cache directory (PD) and all processor cache controls which are exclusively used by the associated CP. The CP generally issues a fetch or store command for each doubleword (DW) unit required by an operand of an instruction being executed. If the DW is represented in the PD, a cache "hit" occurs for the processor fetch and store command, and the DW is fetched or stored in the associated cache in accordance with the command, whereby the command is completed without any need to go outside of the BCE. Occasionally the required DW is not in the cache, which results in a cache "miss". Before a "missed" fetch or store command can be completed, the line containing the requested DW must be fetched from MS and stored into the cache. To do this, the BCE generates a corresponding "line fetch" command which requests an associated system controller (SC) to obtain from MS the line unit of data having the DW required by the IE. Each line is located in MS on a line boundary, but the required DW will be the first DW in the fetched line to be returned to the requesting BCE.

In the MP in FIG. 1, two system controllers SC0 and SC1 are each connected to two CPs and to the shared main storage (MS), so that either connected processor can access any shared area in main storage. The shared main storage is comprised of a plurality of BSMs (basic storage modules), and each pair of BSMs is controlled by a BSC (BSM controller). Each SC also connects I/O to the shared main storage. The shared main storage is comprised of a plurality of BSMs (basic storage modules), and each pair of BSMs is controlled by a BSC (BSM controller).

The preferred embodiment includes the subject matter disclosed in prior U.S. Pat. Nos.: U.S. Pat. No. 4,280,176 issued July 21, 1981, filed Dec. 26, 1978 by K. G. Tan entitled "Memory Configuration, Address Interleaving, Relocation and Access Control System"; U.S. Pat. No. 4,293,910, issued Oct. 6, 1981 filed July 2, 1979 by F. O. Flusche et al entitled "Reconfigurable Key-In-Storage Means For Protecting Interleaved Main Storage"; U.S. Pat. No. 4,394,731, issued July 19, 1983 filed Nov. 10, 1980 by F. O. Flusche et al entitled "Improved Cache Line Shareability Control For A Multiprocessor"; U.S. Pat. No. 4,400,770, issued Aug. 23, 1983, filed Nov. 10, 1980 by S. K. Chan et al entitled "Cache Synonym Detection and Handling Means" and Ser. No. 205,495, filed Nov. 10, 1980 by S. K. Chan et al entitled "Parallel Control For Cache With Line Fetch Buffer", all assigned to the same assignee as the subject invention.

The shared main storage comprises of a plurality of BSM controllers BSC0 through BSC3 in which each BSC connects to two BSMs 0 and 1. The four BSCs 0–3 are each connected to each SC.

A cross-interrogate (XI) bus connects from each SC to the other SC. The XI bus communicates all cross-interrogation (XI) requests and all castout (CO) and invalidate (INV) signals between the SCs to synchronize and coordinate the required line castouts and invalidations in the directories.

Each SC contains a pair of copy directories. Each copy directory (CD) contains an image of the contents of a corresponding processor cache directory (PD) in one of the BCEs connected to the respective SC.

The copy directories handle all cross-interrogation (XI) requests, so that the processor cache directories in the various BCEs will not need to handle the XI interrogation requests and can thereby better service their respective CPs. The XI bus connects all SCs and synchronizes all CD searches for conflicts so that searching is avoided in the PDs.

Each of the CPs 1-3 has an IE identical to the IE0. Each IE unit is basically similar to IE units found in conventional microprogrammed processors.

A doubleword wide bidirectional bus is provided between each BSM in main storage (MS) and each SC port, and from each SC to each associated central processor (CP) and I/O channel controller processor (EXDC). Both commands and data may be sent on any bus. The entire system configuration shown in FIG. 1 is not essential to support the operation of this invention, which is operational with a single SC, its pair of CPs, and at least one BSC with at least one BSM.

When a CP cannot find a requested doubleword (DW) in its cache, its buffer control element (BCE), which controls the CP cache, initiates a line access request to MS by sending a miss command to its associated system controller (SC), which then reissues the command to a required BSC and its connected BSM. In the event of a BSM busy condition, the SC will save the request in a command queue and will reissue it at a later time when the required BSM becomes available. The SC also sequences the MS commands in an orderly fashion, so that all commands to a particular BSM are issued in first-in/first-out (FIFO) order, except when a cache conflict is found. Prior to issuing a miss command the BCE translates the logical (e.g. virtual) address received from the IE into an absolute address which is sent to the SC, and an absolute address to physical address transformation is performed by the SC to determine the BSM location of the requested address. (See U.S. Pat. No. 4,280,176, issued July 21, 1981 filed Dec. 26, 1978 by K. G. Tan.) At the same time in each SC, the request is sent to the storage key array to check for a possible access storage protection violation, and to the copy directories for all CPs to search for a possible data contention conflict. Thus, during the normal sequence of handling a MS request, the SC is constantly monitoring the status of main storage, is analyzing the interrogation results of the storage protect key and all cache directories, is examining the updated status of all pending commands currently being held in the SC, and is also looking for any new BCE commands that may be waiting in the BCE to be received by the SC.

The main storage protect key arrays are located in the system controller as described and claimed in U.S. Pat. No. 4,293,910, issued Oct. 6, 1981, filed July 2, 1979 to F. O. Flusche et al, assigned to the same assignee as the subject application. It performs all key operations defined by the IBM System/370 architecture. Normally, the storage key and cross-interrogation checking is done in parallel with the issuance of the request to memory and does not interfere with the actual main storage access time when no conflict is detected.

Due to the store-in-cache (SIC) design of each CP cache, CP changed data resides only in the associated SIC and is not available in MS until the data is castout of the SIC due to an XI request for a changed line, or by the cache slot replacement selection mechanism whenever cache line space is required for newly requested lines. Each SIC has an associated processor cache directory (PD) which controls the SIC operations.

Because of the nature of each CP store-in-cache (SIC), its updated lines are not stored in MS immediately. Thus, many lines of shareable, unchanged and changed data may be scattered among the SICs of the different CPs. Unchanged SIC lines are available in MS, but changed lines are only available in the one SIC in which they reside.

FIG. 2 shows the format of the directory entry associated with each line in each SIC, of which the valid (V) bit indicates if the associated line is valid or not. The line change (LN CH) bit indicates whether the associated line in SIC is changed or not. The shareability bit (EX) designates the shareability of the associated line as being exclusive in one SIC or as being readonly in plural SICs and is used by the MP cache management controls described and claimed in cited application Ser. No. 205,500 by F. O. Flusche et al. The absolute address bits 8–20 in the line entry are part of the absolute main storage address of the line with bits 19–24 providing the primary congruence class address for each line of sixteen doublewords. The line lock (L) bit is novel to this invention and controls whether the associated line can be invalidated or replaced in the cache when line space is needed in the respective congruence class. The remaining bits in each PD entry are well known and are not pertinent to the subject invention.

Each CP request for a doubleword (DW) unit is accessed from a line unit of operand data and/or instructions in its cache. Main storage accessing efficiency is greatly improved by having line units of plural DWs (e.g. 16 DWs) accessed as a line fetch unit in MS for each cache, and each cache directory is organized to manage its content on a line basis. Therefore, each PD entry controls a line unit and not a DW unit.

Any IE may initiate an operand access command to its BCE, such as shown in FIG. 3, for accessing a doubleword (DW) of data. It is a fetch command if the fetch request bit is on, and it is a store-interrogate (SI) command if the SI bit is on. The store cache signal bit is on only when this command is accompanies by data to be stored in the SIC, and it must be preceeded by a SI command.

Each CP in the MP generates a sequence of checkpoints which are signalled to its PD by means of the checkpoint signal bit in its IE command to its BCE, shown in FIG. 3. FIG. 9 shows the timing of the checkpoint signals provided by the IE. The time between adjacent checkpoints is called a "checkpoint interval", and it may include the execution time for a plurality of instructions in the IE. When the BCE receives any checkpoint signal, it resets all lock (L) bits associated with its SIC. If an error condition anywhere in the system was sensed in the IE, the IE may issue a retry signal in a command to its BCE which executes a retry operation from the last checkpoint. If the error was temporary, the error will not again occur during the retry, and normal execution will continue.

After all L bits for any SIC are reset off at any checkpoint, each L bit will continue to remain off until it is set on by a SI command: which either: (1) contains a logical address that compares-equal with the associated SIC line (called a "hit" herein), or (2) the associated slot is selected for replacement by the requested line (called a "miss" herein). This setting on of an L bit is illustrated in FIG. 9 as occurring during the execution of instruction 2 in the illustrated example of a checkpoint interval. The SI command also sets on the change (CH) bit for the addressed slot at the same time that the SI command sets on the L bit. However, the CH bit is not reset when the L bit is reset by a checkpoing signal.

The occurrence of the next checkpoint ends the current checkpoint interval and resets all L bits. The IE determines when it will issue its next checkpoint signal to that BCE to unlock all locked lines. The IE may hasten a checkpoint signal in response to a cross-interrogation request finding the L bit on for a requested line, and the BCE having the requested locked line issuing a checkpoint request to its IE.

In FIG. 8, a congruence class is selected in cache processor directory (PD) 62, lock array 10, and LRU array 42 by bits 19–24 from the logical address being requested by the IE. The congruence class in lock array 10 has a corresponding set of four lock bits respectively representing the four line entries in PD62. Although FIG. 2 represents the lock bit as effectively part of each PD entry, the implementation shown in FIG. 8 provides the lock bits separately from the PD array, because it is much faster and more convenient to reset all lock bits simultaneously at each checkpoint when the lock bits are physically together and separated from the PD array which does not have its bits reset by a checkpoint signal. Thus, PD array 62 and lock array 10 each have four columns representing the four slots A, B, C, D in each of 64 congruence classes (i.e. the six bits 19–24 provide $2^6 = 64$ classes). The conventional LRU array 42 however only has three columns R, S, T which are coded to represent the order of use for the four slots in each congruence class. The settings of the LRU bits R, S, T in array 42 are determined by the accesses to the slots A, B, C and D in each congruence class, according to the following TABLE 1:

TABLE 1

| Slot Accessed | Turn On | Turn Off | Resultant R | S | T | LRU Slot |
|---|---|---|---|---|---|---|
| A | R.S | None | 1 | 1 | X | C or D |
| B | R | S | 1 | 0 | X | C or D |
| C | T | R | 0 | X | 1 | A or B |
| D | None | R.T | 0 | X | 0 | A or B |

In Table 1, the resultant R, S, T setting contains a value X which is not changed from the zero or one value it had before the respective slot access. Therefore, a total of eight different values may exist for R, S, T which combinatorially represent the LRU slot in the respective congruence class, according to the following TABLE 2:

TABLE 2

| Settings | | | |
|---|---|---|---|
| R | S | T | LRU |
| 0 | 0 | 0 | A |
| 0 | 0 | 1 | A |
| 0 | 1 | 0 | B |
| 0 | 1 | 1 | B |
| 1 | 0 | 0 | C |
| 1 | 0 | 1 | D |
| 1 | 1 | 0 | C |
| 1 | 1 | 1 | D |

The operation of TABLE 1 and TABLE 2 are old in the art, having been disclosed in the previously cited July 1971, IBM Technical Disclosure Bulletin article by Arnold Weinberger.

However, the next to be described feature involving TABLE 3 is novel to this application, which combines the lock array operation with the LRU operation in a unique manner which excludes each locked slot from being selected as the LRU slot in the congruence class, even though it may be the least-recently-used slot in its class. This unique feature is represented in FIG. 8 by the LRU lock selection controls 12, which apply the lock bit settings to the LRU slot values R, S, T to generate a modified LRU selection R', S', T' in any congruence class according to the following TABLE 3:

TABLE 3

| Slot(s) Locked | Modified LRU Selection R' | S' | T' | Unlocked Slot(s) Available |
|---|---|---|---|---|
| A | R | 1 | T | B+C+D |
| B | R | 0 | T | A+C+D |
| C | R | S | 1 | A+B+D |
| D | R | S | 0 | A+B+C |
| AB | 1 | 1 | T | C+D |
| AC | R | 1 | 1 | B+D |
| AD | R | 1 | 0 | B+C |
| BC | R | 0 | 1 | A+D |
| BD | R | 0 | 0 | A+C |
| CD | 0 | S | 1 | A+B |
| ABC | 1 | 1 | 1 | D |
| ABD | 1 | 1 | 0 | C |
| ACD | 0 | 1 | 1 | B |
| BCD | 0 | 0 | 1 | A |

To obtain any "modified LRU selection" in TABLE 3, each indicated R, S, or T bit represents the respective value for that bit currently being provided from TABLE 2 for an addressed congruence class. The 0 or 1 shown in each "Modified LRU Selection" is caused by the "slots locked" in the class which modifies the LRU slot code to pick a non-locked LRU slot in the addressed congruence class. Thus, the "Slots Locked" column represents all combinations of slots locked for a 4-way set associative cache in which each congruence class has at least one unlocked slot, since all slots may not be locked at one time which would prevent replacement selection in the class.

Controls 12 in FIG. 8 receive the locked slot output signals from lock array 10 and the RST signals from LRU array 42 for the addressed class and modify the R, S, T signals into the TABLE 3 R', S', T' signals and translate them into a selection of the unlocked LRU slot A, B, C or D in the addressed class.

For any combination of locked slots, the "Unlocked Slot(s) Available" group shown in TABLE 3 indicates a group of slots from which the non-locked LRU slot must be selected. However, at any given time, only one slot is selected from the "Unlocked Slot(s) Available" group due to the specific binary value being provided from TABLE 2 for each R, S, or T bit not predetermined as a 0 or 1 in TABLE 3 for this addressed class. For example, take the third row in TABLE 3 for the C slot locked, which indicates a modified LRU setting of "RS1". This means that for a given congruence class (having slots A, B, C and D) that slot C is locked and therefore is not available for replacement. Therefore, the next replacement must be selected from the unlocked slots A, B and D (i.e. the "Unlocked Slot(s) Available" group). However, the conventional LRU controls 42 (which operate according to TABLE 2) may currently indicate any of the eight combinations of R S T represented in TABLE 2, such as for example "1 1 0" indicating slot C as the LRU slot. Thus, if the RST code is 1 1 0 (for C), R is 1 and S is 1 which are put into the R', S', T' code of RST to result in 1 1 1 which determines that slot D is the non-locked LRU slot.

Controls 12, in effect, superimpose the lock array settings for the given class upon the general LRU case from TABLE 2 in a mask-like manner to obtain the modified LRU selection (according to TABLE 3 indicated bits R' S' T'). In this example, the "RST" output of TABLE 3 results from locked slot C being combinatorially superimposed on the "1 1 0" indication for slot C from TABLE 2 to generate a "1 1 1" as the R' S' T' value indicating that slot D is the non-locked LRU slot candidate selection.

In order to provide a better understanding of the fundamental operation of this invention, an example of a sequence of fetch and store requests to a cache are illustrated in the following TABLE 4, which illustrates how the LRU states are modified and the effects of a checkpoint (ckpt) operation:

TABLE 4

| Req. Type | H or M | Repl | L On | LRU On | Off | RST | Ckpt Sig. | Final State R'S'T' |
|---|---|---|---|---|---|---|---|---|
| Init | — | — | — | — | — | 000 | — | 000 |
| SI | M | A | A | R,S | — | 110 | No | 110 |
| F(A) | H | — | A | R,S | — | 110 | No | 110 |
| F(A) | H | — | A | R,S | — | 110 | No | 110 |
| SI | M | C | A,C | T | R | 011 | No | 011 |
| SI(C) | H | — | A,C | T | R | 011 | No | 011 |
| F(C) | H | — | A,C | T | R | 011 | No | 011 |
| SI | M | B | A,B,C | R | S | 101 | Yes | 101 |
| F(B) | H | — | — | R | S | 101 | No | 101 |
| SI | M | D | D | — | R,T | 000 | No | 000 |
| F(D) | H | — | D | — | R,T | 000 | No | 000 |
| F(C) | H | — | D | T | R | 001 | No | 000 |

TABLE 4-continued

| Req. Type | H or M | L Repl | L On | LRU On | LRU Off | LRU RST | Ckpt Sig. | Final State R'ST' |
|---|---|---|---|---|---|---|---|---|
| F(A) | H | — | D | R,S | — | 111 | No | 110 |
| F | M | C | D | T | R | 011 | No | 010 |

In TABLE 4, the following abbreviations and letters were used which signify: H-Hit, M-Miss, Repl.-Replaces, L-Lock, Ckpt-Checkpoint, Init-Initial, SI-Store-Interrogate, and F=Fetch.

In summary, the LRU lock selection controls 12 select the non-locked LRU slot as a candidate for the next replacement in any addressed congruence class by eliminating the locked slots from the LRU selection, which is not done by conventional LRU candidate selection (which always chooses the LRU slot from all slots in the class).

As previously mentioned, this invention prefers that each congruence class have at least one of its four slots unlocked and available for replacement at any time. Whenever three slots become locked in any congruence class, a checkpoint request signal is generated by controls 12 which is sent to the IE on line 153. This allows the IE to make one more SI request to lock the fourth slot in the same class before the IE issues the next checkpoint signal that resets all lock bits for the associated cache but does not disturb the content of PD so that the valid slots continue to remain available for accessing in the cache.

Each time a processor issues a store-interrogate signal for accessing a doubleword (DW) of data in the store-in-cache, it causes the existing version of the addressed DW (before it can be changed by a store cache command in a subsequent cycle) to have its cache address stored in a store back address array (SBAA) 17 and have the DW of data stored into a store back data array (SBDA) 16 of the type described in prior cited U.S. Pat. No. 3,736,566.

A store back array counter (SBAC) 18 addresses locations in SBAA 17 and SBDA 16. When reset, SBAC 18 addresses location 0 in each. SBAC is incremented by one each time a SI command is received during normal cache operation. At each checkpoint, SBAC 18 is reset to its initial count (0) by the reset signal on line 33.

The SBDA and SBAA store all DWs and their addresses only for SI commands provided by the processor during the same checkpoint interval. In general, SI commands comprise only a small percentage of IE commands, since most commands are for fetch requests.

The checkpoint interval is controlled by microcode operations in the IE, and a single checkpoint interval generally exists during the execution of N number of instructions by the processor, as shown in FIG. 9. Each checkpoint requires that the CP complete all outstanding storage requests and not issue any new storage request until the checkpoint operation is completed, the processor operating efficiency is increased by minimizing its number of checkpoints. The processor microcode senses checkpoint requests within the IE and to the IE in order to determine when in the instruction stream to issue the next checkpoint signal. For example, a BCE checkpoint request may be caused by locking the third slot in any congruence class, or by a cross-interrogation request from another processor finding the requested line is locked, or by the SBAC 18 exceeding a predetermined fill mark.

BCE checkpoint/retry controls 19 in FIG. 8 receive each checkpoint signal from the IE. When a checkpoint signal is received, checkpoint controls 19 issue a lock reset signal on line 22 to reset all lock bits in the lock array 10 to their unlocked state. The BCE thereby begins the next checkpoint interval with all cache slots being in an unlocked state.

Whenever a retry signal is received by controls 19 on a line 21 from the IE, controls 19 output a sequence of decrement signals on a line 26 to SBAC counter 18 to cause SBDA 16 to read out its DWs into their original cache locations in the reverse order in which they were received by SBDA 16, until SBAC 18 reaches its initial count (0). Then the IE can begin a retry operation from the last checkpoint.

The SBDA for example, may hold up to 256 DWs. If no checkpoint is provided, for example, when the 210th DW is received, a line 27 from SBAC 18 at count 210 sends a checkpoint request signal to the IE. SBAC 18 will not be reset to its initial setting 0 until the next checkpoint occurs, during which several more storage requests may yet be sent from the IE, and during which the SBDA and SBAA may continue their operation until the current checkpoint interval ends, since they still have space between locations 210 and 255 to hold the DWs for subsequent SI requests before the next checkpoint occurs.

Therefore any cache miss should never find a fully-locked congruence class in the cache, i.e. in which all slots A, B, C and D have lock bits on, since then no replacement would be permitted in order to maintain retryability, which requires that no cache slot have more than one line during a checkpoint interval, since a second line would overlay the first line and both lines cannot be restored to a single slot for a retry operation. If ever a cache miss is detected in a fully locked congruence class, a machine check error is generated and sent to the IE, and the IE will cause a retry operation from the last checkpoint using the BCE checkpoint retry controls 19 on line 21. This forces the IE and BCE to retry the CP operations from the last checkpoint, and such error condition will not be permitted to repeat.

Each SC in FIG. 1 contains a copy of the processor directories in the BCEs directly connected to each SC. These copy directories (CDs) control the inter-CP communication (i.e. cross-interrogation, XI) of CP requests, and the CDs reduce interference with normal SIC operation due to inter-CP communications as explained in U.S. Pat. No. 4,394,731, issued July 19, 1983, by F. O. Flusche et al, which disclosure is incorporated into this specification.

The nomenclature used herein distinguishes the issuing CP (which may be any one of CP0-CP3 in the MP issuing a storage request command being XIed) from each of the remote CPs (which are the remaining CPs of CP0-CP3 that did not issue the command for which they are being XIed). The issuing CP and all of its associated entities (i.e. its IE, BCE, PD, SIC and CD) are identified with the suffix (I), i.e. IE(I), BCE(I), PD(I), SIC(I), and CD(I). Every remote CP and all of its associated entities are identified with the suffix (R), i.e. IE(R), BCE(R), PD(R), SIC(R) and CD(R).

A cache miss command (shown in FIG. 4) occurs if any CP(I) requests a DW which is not found in its PD(I), or is found therein with a readonly (RO) designation when the CP(I) issues a store-interrogate (SI)

request which requires that CD(I) cross-interrogate each CD(R) to find if any other SIC(R) has any copy of the line being requested in order to invalidate remote SIC(R) copies so that SIC(I) can have the line exclusively. The lock bit and the EX bit for the requested line are therefore set on in PD(I), so that this line cannot thereafter be cast out of SIC(I) before the end of the current checkpoint interval. The cross-interrogation (XI) of the copy directories for all SIC(R) in the MP asks the other CPs if they have the requested line and assures the requesting SIC(I) will receive the latest updated version of that line, and invalidates any remote copy of the requested line held unchanged in any SIC(R).

When virtual address bits are used to address the cache directories, they cause potential synonym locations in each directory which must be searched for the absolute address of the CP request as described and claimed in U.S. Pat. No. 4,400,770, issued Aug. 23, 1983, by S. K. Chan et al, which disclosure is also incorporated herein. If a synonym is found in PD(I), the lock bit (L) is set for the synonym location instead of the principle location addressed by the SI request.

Cross-interrogation (XI) searching is not done in the PD(R)s so that no PD(R) cycles are stolen for XI purposes, and hence almost all PD(R) cycles are available for IE(R) use. Therefore the XI burden is instead placed on the CD(R)s. A PD(R) is only accessed as a result of an XI search of all CD(R)s only when a CD(R) is found to have the requested line. Thus, most XI searches will not access any PD(R), since only a small percentage of XIs will find any line conflict (e.g. less than 5%).

If a CP(I) store interrogate (SI) command initiated the XI, the command is immediately searched in each CD(R). If a readonly conflict is detected in the CD(R), the SC having the conflicting CD(R) issues an invalidate (INV) command to its associated PD(R) to invalidate the conflicting line, since the L bit must be off for a line held RO. Then the PD(R) sends an ILE (invalidate line entry) command to the CD(R) to invalidate the line, which is communicated immediately back to CP(I).

If an exclusive (EX) conflict is detected, the CD(R) issues a castout (CO) command to its PD(R). Then PD(R) tests its L bit; and if the L bit is off, PD(R) response to the SC command immediately. But if the L bit is on, PD(R) issues a checkpoint request to its IE(R), does not then castout the line, and does not then respond to its SC. The issuing CP(I) then must wait until after the checkpoint (which was requested of IE(R)) before CP(I) can receive the requested data. When the requested checkpoint is shortly thereafter provided by IE(R), then PD(R) responds to SC(R) by issuing a CO (castout) command because the line is held EX and was changed. The PD(R) response to SC(R) is communicated to CP(I) for the XI.

If a readonly (RO) conflict is detected, the CD(R) issues an invalidate (INV) command to its PD(R), which must have the L bit off for this RO case. Then PD(R) responds with an ILE command to invalidate the conflicting entry in SIC(R).

If an I/O channel or service processor (SVP) initiates a fetch or store request to main storage, each CD(R) must likewise be cross-interrogated for the address of the request to determine if any SIC has conflicting data. If a conflict is found with a locked line in PD(R), the operations in PD(R) are the same as described for a CP request.

However, if a SVP or I/O channel fetch request finds a conflicting line in CD(R) held RO (a RO line cannot be locked), then a different action is taken, which causes the line to be retained by the associated SIC, and no communication is done with the associated PD(R), and therefore no L bit is tested since no castout or invalidation is required.

To assure the integrity of the XI operation, all copy directories in the MP are searched simultaneously. Therefore, all CD(R)s in the MP are examined for a line address which matches the line address from each CP(I) miss request in the MP. Each CD search operation also detects the presence of any match in all synonym locations for the requested line in every CD. If no match is found in any CD during the search operation, the line fetch request due to the cache miss is immediately accessed in MS. If a match is detected for a synonym in CD(I), the line fetch request is cancelled and the IE access is made in the synonym location in SIC(I). If a match is detected for either the requested address or a synonym address in CD(R), its L bit is tested in PD(R), as previously described.

Any required castout of an updated line must be made from SIC(R) to MS before its line fetch can be made to SIC(I). Because of this delay for a request with a conflict, it is held in an SC command queue and is reissued to main storage (MS) when the XI signal is received by SC(I) that the castout line has been stored in MS. The command queues and their SC controls are described and claimed in U.S. Pat. No. 4,136,386 filed Oct. 6, 1977 by E. J. Annunziata, owned by the same assignee as the subject application.

The SC connects between MS, the BCEs and the I/O channels by using 72 line bidirectional busses (64 data/command lines plus 8 ECC lines) to provide a doubleword parallel transfer for both the commands are transmitted.

The reason why CP(I) cannot castout a locked line is because of two architectural rules: (1) a retry from the last checkpoint should obtain the same results as the original execution from the same point in the instruction stream, and (2) an MP architectural rule requires that all CPs in the MP at any particular time must see the same value for the same operand, so that all CPs can generate the same results when using the same operand in a given instruction stream. For example, suppose an operand has a value of "3" in a cache line in CP-A, which CP-A locks and changes to "5" during the same checkpoint interval. Then the original "3" value is put into the store back array for CP-A. Then a retry from the last checkpoint would again be changed to "5".

However, if the locked value "5" during the same checkpoint interval were then permitted to be castout and replaced by CP-A without a checkpoint, another CP-B in the MP could obtain that operand from main storage and change its value from "5" to "7", for example. If then CP-A were forced to retry from its last checkpoint, CP-A would again start with the original value "3" for that operand and again change it to the value "5"; while at the same time CP-B is using the same operand with a different value of "7", which violates the architectural rule (2) above that all CPs in an MP see the same value for an operand at the same time.

On the other hand, if CP-A is not allowed to castout the locked value "5", then CP-B cannot get the operand until CP-A resets the lock at the next checkpoint, at which time "3" disappears from the storeback array of CP-A, and this operand with the same value "5".

Furthermore, if a castout of the locked "5" were permitted, and the "3" in the store back array is overlayed with a "5" for the same line address, the retry capability from the last checkpoint is lost because such retry in CP-A would use "5" instead of "3" with an instruction stream that is retrying from a point where it originally used the value "3", and therefore the retry would not obtain the same results as the original execution which it is suppose to be replacing, which is a violation of architectural rule (1) above that a retry must get the same results as the original execution being retryed.

The preferred embodiment of the present invention is shown as being implemented in a large data processing system having an architecture associated with the IBM System/370. This architecture is disclosed in the IBM System/370 Principles of Operation (Form No. GA22-7000-4).

Pertinent circuits in each BCE are generally shown in a simplified manner in FIG. 8. The more precise detailed control circuits are shown in FIGS. 10, 11, 12A, B, C, D and E, 13 and 14.

Whenever any central processor (CP) must either fetch or store a doubleword (DW) of data, the instruction and execution element (IE) in the CP issues the IE command shown in FIG. 3 to the local buffer control element (BCE) in the CP. The information in the IE command pertinent to the subject invention includes a storage protection key, the logical address of the request, the type of request (i.e. whether it is a fetch request or a store interrogate (SI) request), and whether the data is being requested exclusively (EX) by the CP so that it can store into the data or whether the data is requested non-exclusively (i.e. readonly so that it may be shared on a fetch-only basis among a plurality of processors, none of which is permitted to write into the requested data). The SI request also sets the L bit for the selected cache slot and indicates that an IE store cache command may subsequently be provided to the line when the housekeeping (e.g. translation and/or line fetch) is completed. If no store cache command follows the SI request, the SI request is handled like a fetch command and the requested DW is fetched and sent to IE. Any subsequent IE store command contains a store cache signal, at which time the IE provides the data on the data-in-bus to the cache to be stored in the cache slot determined by the address in this command. Generally, the IE uses an SI request for a fetch if the fetch is to be followed by other request(s) to the same line which must not be changed by any other processor between those request(s), in order to guarantee an atomic relationship for such sequence of accesses by CP(I).

FIG. 7 illustrates how the logical address in the IE command (see FIG. 3) addresses the processor directory (PD). Bits 19-24 in the address are used to select a row (called a congruence class) in the processor directory (PD) 62. FIGS. 10 and 11 show that each congruence class contains four slots A, B, C and D which are capable of representing four respective lines in the associated SIC. In FIG. 11, the translated address on line 109 is simultaneously compared with the addresses in each of these four slots which have their valid bits on. If any slot address compares equal, it represents a hit with the requested line.

Approximately 95% of the IE fetch and store requests obtain hits in SIC(I). For the remaining small percentage of the requests which miss in the cache (i.e. no hit), the request cannot be satisfied until that line of data containing the request double-word is fetched from MS into the SIC(I) of the requesting processor. Before the line fetch can be made, some important housekeeping functions must be performed. The first is to assure that there is room in the requesting SIC(I) for the requested line, i.e. one or more slots have their invalid bit on. If there is no room, then the least-recently-used (LRU) replacement selection circuits in FIG. 12B must select which one of the four slot locations in the addressed congruence class is to receive the line to be fetched. If the V and CH bits for the line to be replaced indicate a currently valid and changed line exists in that location, that line must be castout to MS before that slot can receive the new line from MS. Also, before the new line can be fetched from main storage, there must be assurance that main storage has the most recently updated version of the new line. This update test is made by cross-interrogating (XIing) all CDs in the MP to determine whether any SIC(R) has a changed version of the line. An updated line possibility is indicated when any CD(R) is found to have the address of the line; and a remote updated line is confirmed if the change (CH) bit is on for that line in the associated remote processor PD(R). The lock (L) bit is also then tested and if on indicates that CP(R) does not want to immediately give up that line to the requesting CP(I).

Figure 12B:
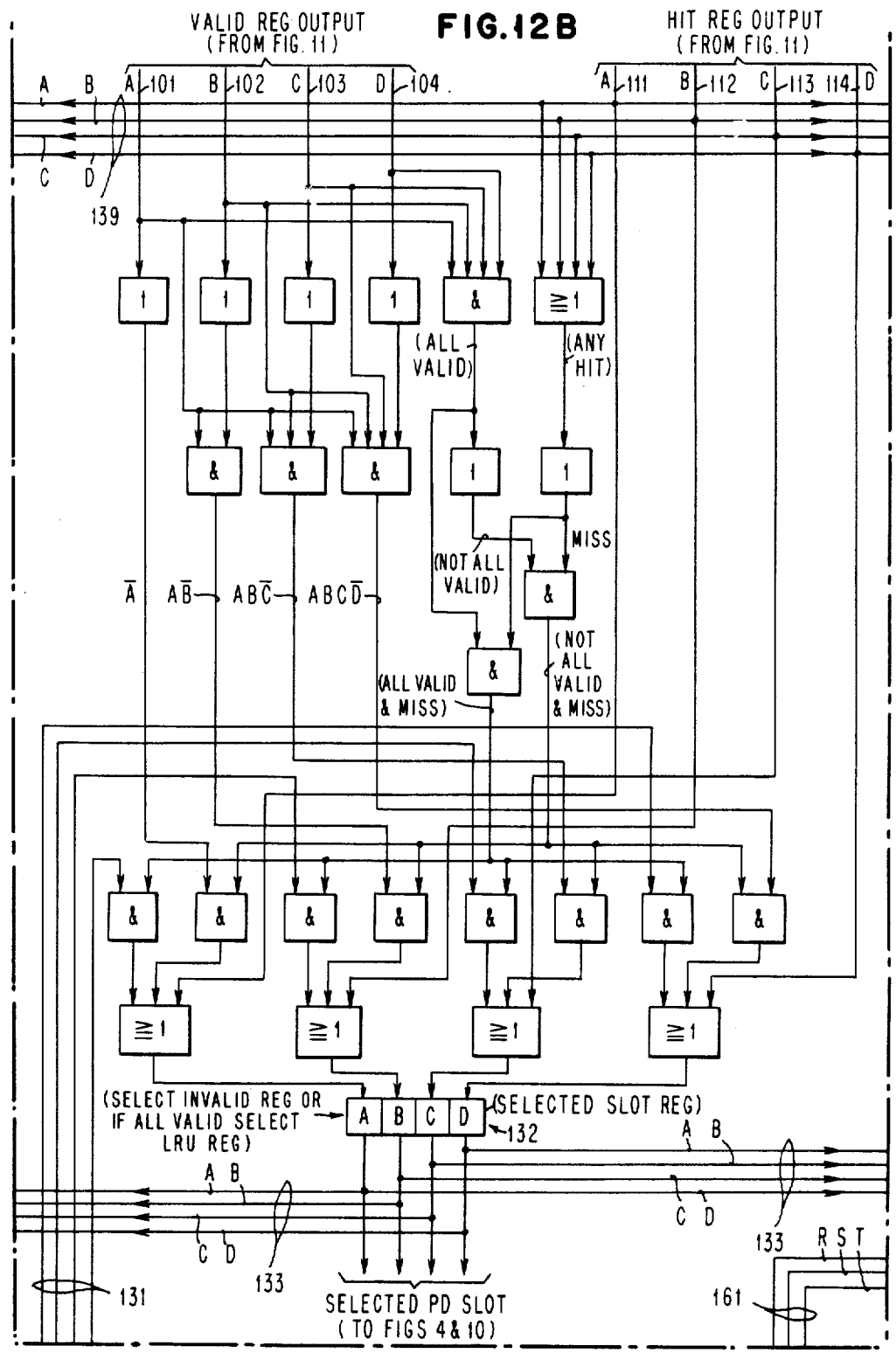

Whenever a cache miss occurs in PD(I), the PD(I) slot replacement selection controls shown in FIG. 12B select an invalid slot, or if there is no invalid slot select the least-recently-used valid slot among the non-locked valid slots in the addressed PD(I) class. That is, if the valid (V) bit is off in any line entry, it may be immediately selected for the new line in the slot order of A, B, C and then D. Lines 101, 102, 103 and 104 from the valid register in FIG. 11 represent the valid indications for slots A, B, C and D in the addressed class. If all valid bits are on for all slots in the class, then the least-recently-used slot (indicated by activation of one of lines 131 from FIG. 12D) is selected. If the CH bit is on in the selected slot, then an updated line currently resides in this slot and it must be castout before the new line can be received by the SIC(I) 63.

Whenever a cache miss is signalled on line 121 in FIG. 11, a BCE miss command (shown in FIG. 4) is generated in BCE(I) and is sent to its SC which makes a request to MS for the line to be fetched, and initiates the XI operations which transmits the miss command (FIG. 4) to the CD(R)s. The miss command contains the translated absolute address of the requested data, the selected slot position in PD(I) (indicated by activation of one of the four output bits A, B, C or D) from a BCE(I) selected slot register 132 shown in FIG. 12B, an OP code field which encodes the line fetch request, a length field which indicates the number of doublewords in the line to be fetched, a SI bit field which indicates whether or not the miss command is a result of a store interrogate request from the IE, and an EX signal field which indicates whether or not the IE requested the data exclusively or readonly. The processor ID field is not transmitted by the BCE but is inserted by the SC when it receives the command, in order for the XI operation to identify the processor from which the command was received, since the XI operations use commands from a number of different processors including from any CP, an I/O processor, or a service processor.

An XIR priority circuit (not shown) in the SC determines when the received command initiates an XI operation by being provided simultaneously on the XI bus to the other copy directories (CDs) in the system. This initiates a simultaneous search of all copy directories in all SCs (whether the MP has only a single SC or plural SCs). XI search sync lines connect between plural SCs to synchronize all CD searches in the same machine cycles. The search is for the absolute address of the line for the command currently being searched. Cited Pat. No. 4,394,731 to F. O. Flusche et al contains a more detailed description of the XI operations.

Although each CD has an entry for every line found in its correnponding PD, the CD need not have all of the information found in its corresponding PD. This embodiment only requires that each CD include the valid (V) and exclusive (EX) bits and high-order absolute address bits 8-20 for each represented line. The entry format found in each PD slot is shown in FIG. 2 which includes the L bit to accomplish the purposes of this invention by indicating whether or not the corresponding line is locked in the associated SIC.

In general, each IE sends fetch and store commands (shown in FIG. 3) to its associated BCE. Instruction fetch requests are requested readonly. IE operand store requests always have the SI request bit on, which also sets the PD entry's L bit in FIG. 2. For a true store operation, such SI command is followed by another IE command which has the store cache signal field on, and is accompanied by the data being provided by IE(I) to SIC(I). Most IE operand fetch commands have the fetch request bit on. Under special circumstances, this invention enables the SI request bit to be used for a fetch request in order to lock the fetched line so that the IE can obtain a guarantee from the BCE that the fetch request will be atomic with subsequent requests provided by the same IE.

Whenever a CD(R) finds a conflicting address for a XIed request command, the SC for that CD(R) sends a command of the type shown in FIG. 5 to its related PD(R). The SC command signals the detected conflict on line 160 in FIG. 14, which sets an SC request trigger 166 in BCE(R). One of the responding BCE(R) operations (which is the response pertinent to this specification) is a test of the state of its L bit for the conflicting line in the lock array local to this BCE(R). This test is done in FIG. 13 which illustrates the lock bit test circuit found in each BCE, which operates with the lock array out register 141A in FIG. 12A which is local to the same CP. The conflicting line's congruence class, and slot in that congruence class, is determined by the CD class and CD slot signals provided in the current SC command (shown in FIG. 5), which is provided from the SC to register 65 in FIG. 13. The pertinent lock bit is selected by the one of the select gates actuated by the CD slot signal from register 65. If the L bit for the conflicting line in the local (LCL) BCE tests in an on state, an L bit test signal is transmitted on line 161 from FIG. 13 to AND circuit 162 in FIG. 14.

In FIG. 14, AND circuit 162 receives its other input from the output of the SC request trigger 166 which indicates when an SC request is provided to this PD(R) as a result of an XI request. The output 163 of circuit 162 sets a line hold trigger 164 which remains set while the line is locked in this PD(R). As long as trigger 164 is set, its output via inverter 166 disables an AND circuit 167, so that no command request signal can then be provided in this BCE for it to generate a response to the detected conflict (which will be done in FIG. 15). The output 163 of AND circuit 162 also sets a checkpoint request trigger 156 via an OR circuit 154. When on, the output of trigger 156 requests the IE for a checkpoint as soon as the IE is able to provide it, e.g. when it completes its current instruction.

Hence, this CP(R) continues to execute and it decides when it will take its next checkpoint, which is required before (CP(R) can give up the conflicting line. During its execution, this CP(R) may issue requests to its local PD which may hit or miss. If a local (LCL) PD miss occurs, it provides a signal on line 176 in FIG. 14 to AND circuit 177 while circuit 177 is being conditioned by the output of line locked trigger 164 indicating the existence of an unresolved conflicting line in this PD(R). The local miss output of AND circuit 177 passes through OR circuit 171 to set the BCE command trigger 172 for one cycle which on line 173A signals its SC that this BCE is sending it a command, and also sends it a conflicting line locked signal through enabled AND circuit 173 to line 174 that causes the SC to transmit a conflicting line locked signal to the issuing PD(I). The output of trigger 172 also passes through OR circuit 175 to reset the line locked trigger 164. As a result, the conflict command is erased from BCE(R), and must be later reissued by SC(R).

Accordingly, its SC can begin and complete a line fetch for a miss command from this PD(R) while this PD(R) is awaiting a checkpoint so that it can release a locked line requested by another CP.

When this IE(R) eventually provides the requested checkpoint, the checkpoint signal is provided on line 157 to reset both the checkpoint trigger 156 and is sent to the SC(R) to cause the SC(R) to reissue the original CP(I) request which has the unresolved conflict. Also in FIG. 12A, the checkpoint signal on line 157 also resets all the lock bits in the lock array 141. The lock array 141 may be constructed of trigger circuits which all have their reset lines connected to checkpoint signal line 157, so that all lock bits in array 141 are reset simultaneously by each checkpoint signal. A simultaneous checkpoint reset is important in obtaining high performance for large CPs, since it avoids requiring any CP to wait for a sequential reset, which would result from having the lock bits structurally included in a conventional type of cache directory array.

After a checkpoint signal, the lock bits to register 141A in FIG. 13 will test in an off state, and line 161 to AND circuit 162 in FIG. 14 is not active and will not set the line locked trigger 164 which remains off.

With the lock bit off, the circuit in FIG. 15 for this PD(R) responds to the conflict caused SC command with a BCE command CO (as shown in FIG. 6) indicating the requested line is now being castout according to the request of the pending conflict-caused SC command.

In FIG. 15, the dropping of the line locked signal on line 163 causes AND circuits 191-194 to become enabled in accordance to request bits in the pending conflict-signalling SC command in the SC command register 65 in FIG. 13. The signal from any of AND circuits 191-194 passes through OR circuit 195 to actuate a BCE response reset, which resets register 65 and also is provided to line 165 in FIG. 14 to set the BCE command trigger 172 to signal the SC that it is providing a PD command to the SC. At this time, AND circuit 173 is not enabled because the line locked trigger 164 had been reset by the previous checkpoint signal.

It is possible for a system deadlock to occur in the MP if two CPs concurrently have conflicts with each other before either can take a checkpoint. Then each CP will be waiting for the other CP to take a next checkpoint, but neither CP can get to its next checkpoint without first receiving the conflicting data from the other CP which cannot be provided. A possible deadlock condition is detected by circuits 181, 182 and 183 in FIG. 14. A line hold trigger 181 is set by a conflicting line locked signal from another CP provided on line 184. The other CP provides that signal on its line 174 via the SC to this CP's trigger 181 (each CP has all of the circuits in FIG. 13, 14 and 15 in its local BCE). Thus, trigger 181 is set whenever it receives a signal from any other CP that senses a conflicting locked line. Then if the local CP (i.e. local to this trigger 181) also senses a conflicting locked line by a signal on its lead 163, its AND circuit 182 is enabled and sets its deadlock trigger 183, which sends a signal to the SVP for the MP system (see FIG. 1) that a potential deadlock exists. The relatively slow SVP will respond after a time period which is sufficiently long that if no deadlock exists, one of the two CPs will have taken a checkpoint and broken the deadlock. But if neither CP has then taken a checkpoint, a deadlock is presumed to exist and the SVP forces one of the CPs to retry to its last checkpoint which resets the lock array in that CP and breaks the deadlock.

The lock controlled LRU slot replacement selection circuits shown in FIGS. 12A-E are now discussed in more detail. The lock array 141 is shown in FIG. 12A as implemented separately from the PD array 62 in FIG. 10 or 11, because all lock bits must be reset to off state as a group by each checkpoint signal from the IE. Nevertheless each lock bit in array 141 is associated with a directory entry in PD62 in the same congruence class and the same slot in the class, so that each PD entry can be considered to logically contain the L bit shown in FIG. 2.

In FIG. 12A, the lock bit in one slot in the addressed class is set by an output from one of the OR circuits 135 when it receives an input from either AND circuits 134 or AND circuits 137. One of the AND circuits 135 provides an output when a SI request is being provided from the IE via AND circuit 136 and a hit is signalled on one of lines 139. One of AND circuits 137 provides an output when a SI request having a cache miss is being provided from the one of AND circuits 137 that is being enabled by the one of the lines 133 representing the slot being replaced.

The circuits in FIG. 12C detect when a third slot is locked in the addressed congruence class. The currently locked slots in the class are indicated by the lines 142 from lock array 141. The six AND circuits 151 represent all combinations of any two slots currently locked in the addressed class. Whenever any third slot is locked in the class, a checkpoint request trigger 156 is set by line 153, and then outputs a checkpoint request signal which is sent to the associated IE. An output from any of the six AND circuits 151 passes through an OR circuit to condition an AND circuit 152. However, trigger 156 is not set until AND circuit 152 is activated by an SI access signal from any of the four OR circuits 134 in FIG. 12A which is about to lock the third slot in the addressed class. Note that during the cycle in which the second slot is locked, that the lock array is only outputting one locked slot, so that none of AND circuits 151 is then activated when that SI access signal conditions the other input to AND circuit 152, which thereby remains disabled during the locking of the second slot in any class.

Figure 12D:
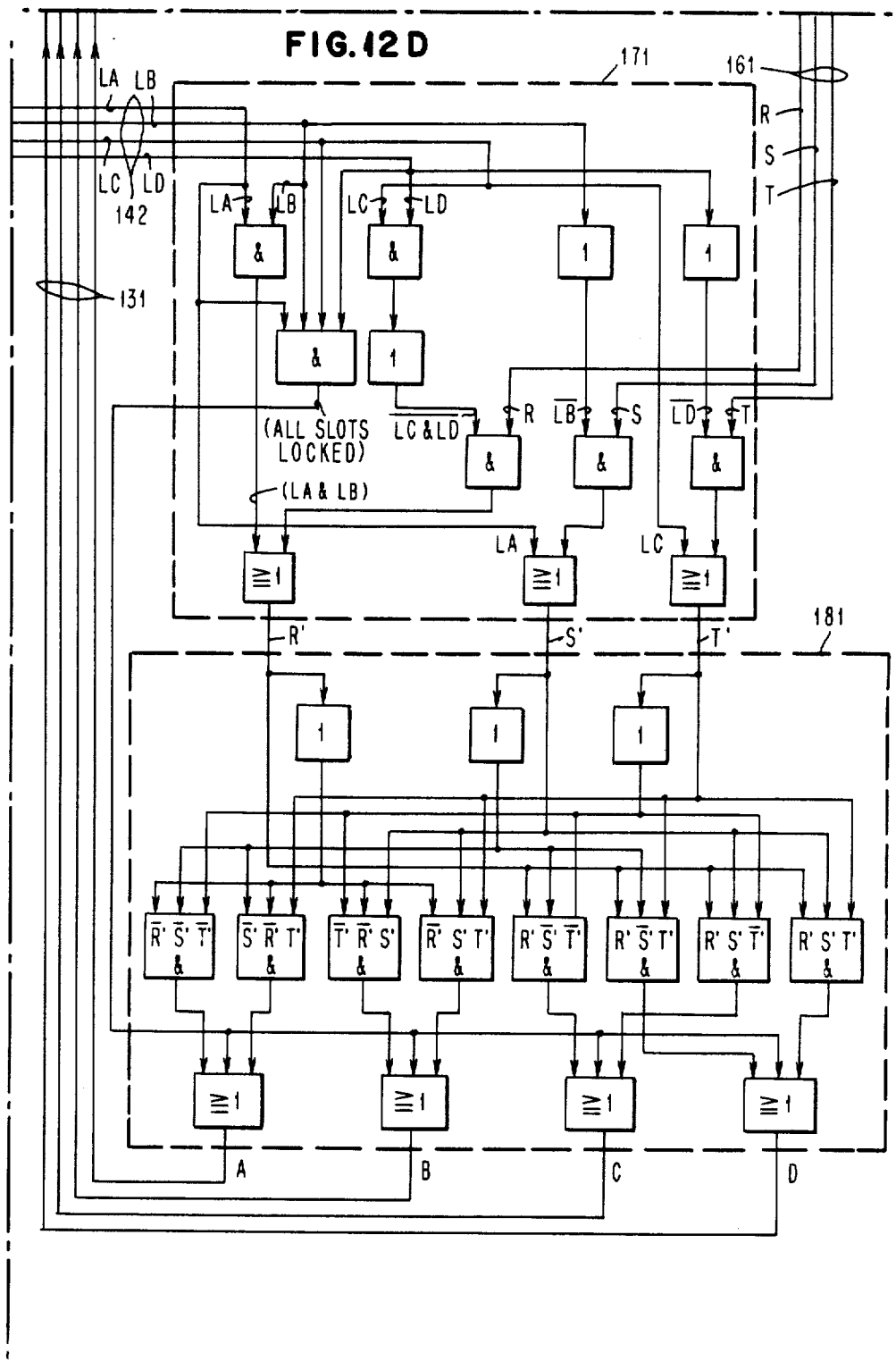
Figure 12E:
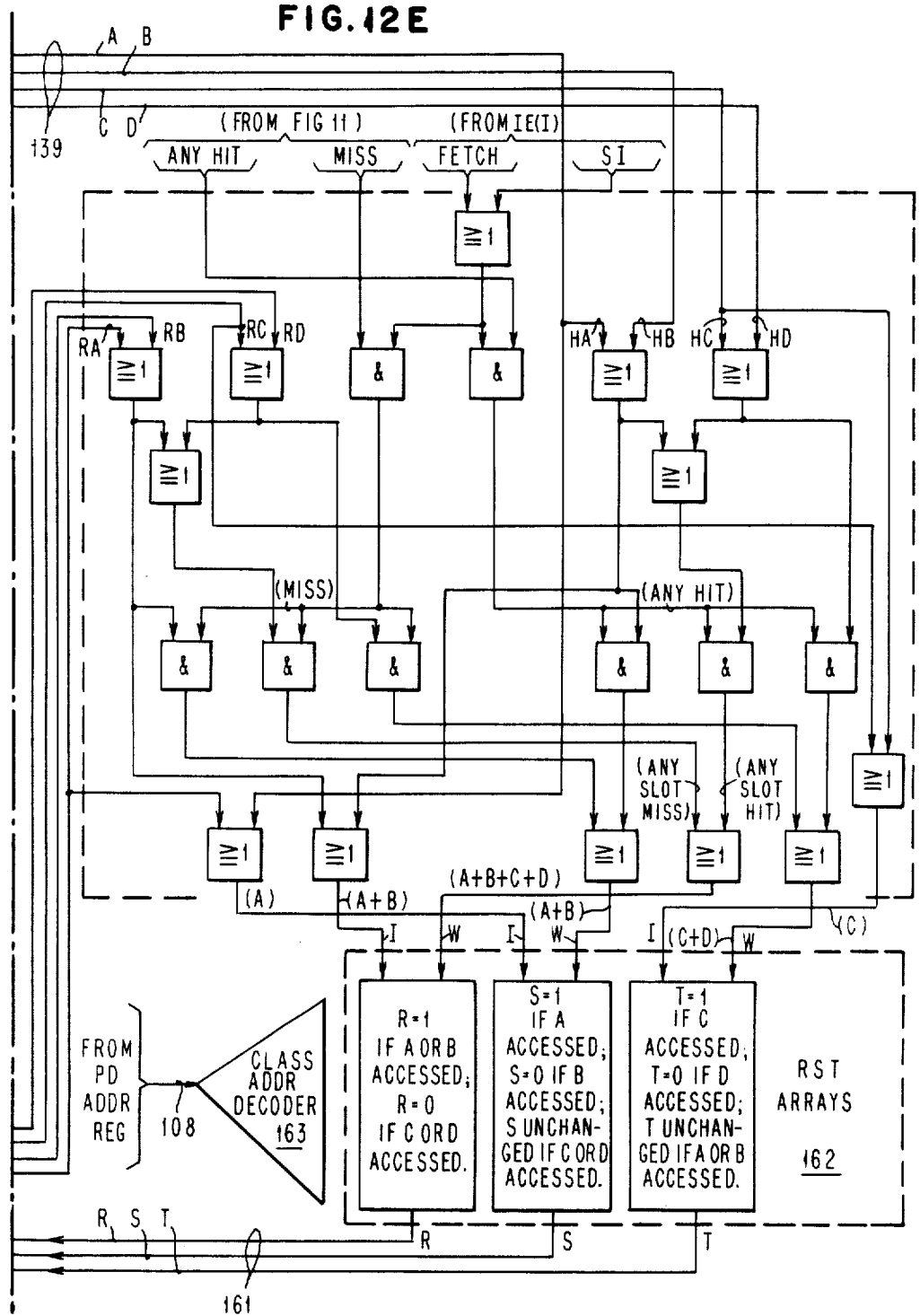

FIG. 12E contains a conventional LRU replacement selection circuit of the type disclosed in the cited 1971 article to A. Weinberger. The RST output lines 161 provide the codes shown in TABLE 2, previously included and discussed in this specification. The RST array comprises three separate array circuits R, S and T which respectively contain the R, S, and T values for all congruence classes. The three array circuits are addressed by the same class address decoder 163 which receives the PD congruence class address bits 19-24 on bus 108 from the PD address register in FIG. 7. Each of array circuits R, S and T has two inputs, I and W. The W input must be active in order to write anything into the array bit in the currently addressed congruence class. The W input is active on any access (i.e. hit or miss with replacement) which sets a value into the array circuit indicated in TABLE 1 herein. The I input then controls whether the zero (0) or one (1) bit value is written. When the W input is not active, the addressed array bit is not changed in accordance with TABLE 1.

Thus, in the R array circuit, its W input is activated on every slot access (i.e. A or B or C or D access) while its I input writes a 1 bit if the A or B slot is accessed, or writes a 0 bit if the C or D slot is accessed. The W input of the S array circuit is active only for A or B slot accesses, while the I input writes a 1 bit during the A slot access and a 0 bit during the B slot access. The W input of the T array circuit is active only for a C or D slot access, while its I input writes a 1 bit for the C slot access and a 0 bit for the D slot access.

R', S', T' circuits 171 in FIG. 12D receive the RST lines 161 from FIG. 12E (via FIG. 12B), and also receive the ABCD lock array output lines 142 from FIG. 12A (via FIG. 12C) to perform the invented function (previously described in regard to TABLE 3 herein) of eliminating the locked slot(s) from every replacement choice and then selecting the replacement slot as the LRU slot among the remaining non-locked slots. The non-locked LRU slot replacement selection for an addressed congruence class is indicated by the R'S'T' signals outputted from circuits 171 to circuits 181.

Circuits 181 in FIG. 12D translate the three received R'S'T' combinatorial signals into one of the four signals A, B, C or D in the lines of bus 131 to represent the non-locked LRU slot currently available for replacement in the addressed class. The available non-locked LRU slot signal in bus 131 is provided to FIG. 12B as an input to the slot selection circuits in FIG. 12B, which make the final slot selection for the addressed class and sets each final selection into the selected slot register 132. If any invalid slot exists, it will be chosen for replacement by the circuits in FIG. 12B instead of any valid LRU slot indicated by the signals on bus 131. Thus, the non-locked LRU slot outputted from FIG. 12D is only selected for replacement when all slots A, B, C and D are valid in the addressed class.

Although this invention has been shown and described with respect to the single embodiment thereof, it should be understood by those skilled in the art that various changes and omissions in the form and details of the invention may be made therein without departing from the spirit and the scope of the invention.

Having thus described our invention, what we claim as new and desire to secure by Letters Patent is:

1. In a MP having a plurality of central processors (CPs), each CP having an instruction execution (IE)

unit, a store-in-cache and a cache directory that has a plurality of congruence classes respectively addressed by selected bits from an IE requested logical address, each congruence class being set-associative with a plurality of entries, each entry including a valid bit to indicate the validity or invalidity of data in a cache location associated with the entry, and a replacement selection circuit for selecting an entry as a replacement candidate in each congruence class, each CP also comprising:

- a lock bit associated with each entry in the CP's cache directory, a cache entry being in a locked state when an associated lock bit is in an on state to provide a locked entry,
- means for modifying the replacement selection circuit to exclude each locked entry in the congruence class from being a cache replacement candidate for the congruence class,
- lock bit reset means for resetting the lock bits for all cache entries, the states of the valid bits of the cache directory not being affected by operation of the lock bit reset means,
- means for setting on the lock bit for a cache entry being accessed by the address of a store operand request to the cache directory,
- cache accessing means performing a fetch of cache data in response to a fetch request to the cache directory finding a valid cache entry without changing the state of the lock bit for the cache entry.

2. In a MP as defined in claim 1, each CP further comprising:
- a lock array containing all the lock bits for the cache directory and being arranged with the same number of congruence classes and set-associativity as the cache directory to provide a lock bit corresponding to each entry in the cache directory,
- store-interrogate signalling means introducing each store request from the IE to the cache directory and for setting on the lock bit associated with a requested cache directory entry,
- checkpoint means connected to the lock bit reset means for resetting all lock bits in the lock array in response to a checkpoint signal from the IE.

3. In an MP as defined in claim 2, the additional operand request means in each IE further comprising
- cache store signal requesting means, and
- means for connecting the cache to the cache store signal request means to store IE data in the cache when provided with a cache store request.

4. In an MP as defined in claim 1, further comprising cross-interrogation means transmitting a requested line address by any CP to the cache directory of each other CP to check for a conflicting entry having the same line address as the requested line address,
- means for testing the lock bit in the lock array associated with any conflicting entry found in any cache directory by the cross-interrogation means,
- means for inhibiting the cast out or invalidation of the conflicting entry from the associated cache if the lock bit is on for the conflicting entry,
- whereby the associated CP retains the conflicting entry at least until the lock bit is turned off at a next checkpoint.

5. In an MP as defined in claim 4, further comprising a plurality of copy directories being respective copies of the cache directories in the MP,
- the cross-interrogation means including: means for comparing each requested line address with entries in the copy directories to determine the existence of a conflicting entry in the cache associated with any copy directory having a conflicting entry,
- copy directory command means for transmitting a castout or invalidate command to its related cache directory when a conflict is found by the associated comparing means,
- the lock bit testing means responding to the castout or invalidate command by testing the state of the lock bit associated with the conflicting entry,
- lock communication means for response signalling the state of the lock bit to the CP providing the requested line address,
- whereby the requesting CP may receive the response signalling for indicating if the requesting CP will immediately get access to the requested line.

6. In an MP as defined in claim 1, the selection replacement modifying means further comprising
- a lock array output register receiving all lock bits for the congruence class being addressed in the lock array by the IE requested logical address to indicate the locked entries in the addressed congruence class,
- exclusion means being connected to the lock array output register and to the replacement selection circuit to exclude from consideration for replacement selection the locked entries in the addressed congruence class,
- whereby an unlocked entry is selected as a replacement candidate for the addressed congruence class.

7. In an MP as defined in claim 6, each CP further comprising
- plural lock bit detecting means being connected to the output of the lock array output register for detecting a predetermined plurality of lock bits being set on, the predetermined plurality being at least one less than the set-associativity of each congruence class in the cache directory,
- checkpoint request gating means having inputs for receiving the output of the plural lock bit detecting means and for receiving the special type operand request,
- whereby the checkpoint request gating means provides a checkpoint request signal for the IE when the next special type operand request occurs after the plural lock bit detecting means indicates the predetermined plurality exists of lock bits set on for the addressed congruence class.

8. In an MP as defined in claim 6, the replacement selection circuit in each CP further comprising
- an LRU array in which each congruence class contains a plurality of bit positions which combinatorially indicate the entry slot selected as the current replacement candidate on a probable least recently used (LRU) basis for each congruence class.

9. In an MP as defined in claim 8, the exclusion means in each CP further comprising
- LRU modifying circuit means for forcing one or more predetermined outputted bit positions from the LRU array for an addressed congruence class into one or more predetermined bit values in response to the states of the lock bits received from the lock array output register,
- whereby the LRU modifying circuit means outputs a LRU replacement candidate signal having the one or more predetermined outputted bit positions and having the remaining one or more bit positions in the candidate signal retain the corresponding value outputted from the LRU array.

10. In an MP as defined in claim 9, each CP further comprising
a selected entry register having N number of positions respectively representing the entries in any addressed congruence class, any position being settable to indicate whether the represented entry is currently selected for replacement in the addressed congruence class,
invalid entry means providing an invalid entry signal for each invalid entry in the addressed congruence class of the requested cache directory,
an entry selection circuit means connected to the output of the LRU modifying circuit means to receive the LRU replacement candidate signal and connected to each invalid entry means, the entry selection circuit means setting a position in the selected entry register to indicate the next replacement entry as one of the invalid entries if any invalid entry exists or as the LRU replacement candidate signal if no invalid entry exists.

11. In an MP as defined in claim 10, each CP further comprising
means for sensing when all entries are locked in the addressed congruence class,
all entries locked means connected to the output of the lock array output register to detect whenever all entries are locked in the addressed congruence class,
all valid means for receiving all the valid bits from the addressed congruence class in the cache directory and indicating when all entries in the class are valid,
line miss detection means for providing a miss signal when an IE request does not have a corresponding line in the associated cache directory to provide a miss signal output,
locked class gate means receiving the outputs of both the all entries locked means and the all valid means and receiving the output of the line miss detection means,
whereby all positions in the selected entry register are set to an indicated replacement value to indicate the current IE request cannot be replaced in the required cache.

12. In an MP as defined in claim 11, each CP further comprising
each congruence class in the cache directory having four entries for containing up to four valid set-associative lines,
each congruence class in the lock array having first, second, third, and fourth lock bit positions for the respective four entries in the same congruence class in the cache directory, and
each congruence class in the LRU array having first, second, and third LRU bit positions for combinatorially indicating the probable LRU entry in each congruence class.

13. In an MP as defined in claim 12, the LRU modifying circuit means in each CP further comprising
first AND gate means for receiving the first and second lock bit positions for the addressed congruence class,
second AND gate means for receiving the first LRU bit position and the complement of the third and fourth lock bit positions,
first OR circuit means for receiving the outputs of the first and second AND gate means,
third AND gate means for receiving the second LRU bit position and the complement of the second lock bit position,
second OR circuit means for receiving the first lock bit position and the output of the third AND gate means,
fourth AND gate means for receiving the third LRU bit position and the complement of the fourth lock bit position,
third OR circuit means for receiving the third lock bit position and the output of the fourth AND gate means,
whereby outputs of the first, second and third OR circuit means provide the coded LRU replacement candidate signal as the output of the LRU modifying circuit means.

14. In an MP as defined in claim 13, each CP further comprising
combinatorial AND gate means for respectively receiving all eight combinations of the three outputs of the LRU modifying circuit means to provide eight permutted outputs,
four OR circuit means respectively ORing pairs of the eight permutted outputs, each pair having the same permutation of the first and second outputs of the coded LRU replacement candidate signal,
whereby outputs of the four OR circuit means provide the LRU entry candidate, wherein each locked entry is excluded from the candidate selection.

* * * * *